United States Patent
Seo et al.

(10) Patent No.: US 11,544,524 B2
(45) Date of Patent: Jan. 3, 2023

(54) ELECTRONIC DEVICE AND METHOD OF OBTAINING EMOTION INFORMATION

(71) Applicant: SAMSUNG ELECTRONICS CO., LTD., Suwon-si (KR)

(72) Inventors: Chanwon Seo, Suwon-si (KR); Lei Zhang, Suwon-si (KR); Yehoon Kim, Suwon-si (KR); Sojung Yun, Suwon-si (KR); Dongwan Lee, Suwon-si (KR); Yongsung Kim, Suwon-si (KR); Juyoung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 802 days.

(21) Appl. No.: 16/460,617

(22) Filed: Jul. 2, 2019

(65) Prior Publication Data

US 2020/0104670 A1 Apr. 2, 2020

Related U.S. Application Data

(60) Provisional application No. 62/738,656, filed on Sep. 28, 2018.

(30) Foreign Application Priority Data

Nov. 14, 2018 (KR) .................. 10-2018-0140093

(51) Int. Cl.
*G10L 25/63* (2013.01)
*G06N 3/04* (2006.01)
(Continued)

(52) U.S. Cl.
CPC ............... *G06N 3/04* (2013.01); *G06N 3/08* (2013.01); *G06V 40/174* (2022.01); *G10L 25/63* (2013.01)

(58) Field of Classification Search
CPC ............ G06N 3/04; G06N 3/08; G10L 25/63; G06V 40/174
See application file for complete search history.

(56) References Cited

U.S. PATENT DOCUMENTS 9,189,471 B2   11/2015   Kim
2014/0112556 A1*  4/2014   Kalinli-Akbacak .... G10L 17/26
                                                        382/128

(Continued)

FOREIGN PATENT DOCUMENTS

KR   10-2012-0092846 A   8/2012
KR   10-2016-0061856 A   6/2016

(Continued)

OTHER PUBLICATIONS

Mate Labs, Everyhting you need to know about Nerual Networks, retrieved from havernoon.com, Nov. 1, 2017, whole document (Year: 2017).*

(Continued)

*Primary Examiner* — Sonia L Gay
(74) *Attorney, Agent, or Firm* — Sughrue Mion, PLLC

(57) ABSTRACT

Emotion information is obtained by an electronic device in order to improve communication between a person and the electronic device. Multimedia data is obtained regarding a person, predicted values for the person are obtained by applying the multimedia data to neural network models, and emotion information of the person is obtained by applying the predicted values to a weight model. Then, feedback information is obtained from the person with respect to the first emotion information of the person. Finally, the weight model is updated by using the feedback information. Subsequently, when multimedia data are again obtained regarding the person, new predicted values for the person are obtained by applying later multimedia data the plurality of neural network models, and emotion information of the (Continued)

person is again obtained, but this time using the weight model updated using the feedback information.

18 Claims, 15 Drawing Sheets

(51) Int. Cl.
*G06N 3/08* (2006.01)
*G06V 40/16* (2022.01)

(56) References Cited

U.S. PATENT DOCUMENTS

| | | |
|---|---|---|
| 2016/0128588 A1 | 5/2016 | Melosh et al. |
| 2016/0300252 A1 | 10/2016 | Frank et al. |
| 2016/0350801 A1 | 12/2016 | Vincent et al. |
| 2018/0101776 A1* | 4/2018 | Osotio ................. G06F 16/258 |
| 2018/0181799 A1 | 6/2018 | Yoo et al. |
| 2020/0125956 A1* | 4/2020 | Ravi .................... G06N 3/0454 |

FOREIGN PATENT DOCUMENTS

| | | |
|---|---|---|
| KR | 10-1719546 B1 | 3/2017 |
| KR | 10-1749706 B1 | 6/2017 |
| WO | 2018039648 A1 | 3/2018 |

OTHER PUBLICATIONS

Moon et al., Emotion Recognition Method Based on Multimodal Sensor Fusion Algorithm, Jun. 2008, International Journal iof Fuzzy Logic and Intelligent Systems, vol. 8, p. 105-110 (Year: 2008).*
Communication dated Jul. 29, 2021 issued by the European Intellectual Property Office in counterpart European Application No. 19868061.3.
Nicolaou et al., "Continuous Prediction of Spontaneous Affect from Multiple Cues and Modalities in Valence-Arousal Space", IEEE Transactions on Affective Computing, IEEE, vol. 2, No. 2, Mar. 2011, 14 pages total, XP011479412.
Florin Leon et al., "Evaluating the Effect of Voting Methods on Ensemble-Based Classification", IEEE, Jul. 2017, 6 pages total, XP033136952.
International Search Report and Written Opinion (PCT/ISA/210 and PCT/ISA/237), dated Oct. 25, 2019 by International Searching Authority in International Application No. PCT/KR2019/008652.

* cited by examiner

Audio model (611)

| | Angry | Disgust | Fear | Happy | Neutral | Sad | Surprise |
|---|---|---|---|---|---|---|---|
| Emotion confidence value (611-1) | 0.01 | 0.01 | 0.02 | 0.45 | 0.2 | 0.21 | 0.1 |

Video model (612)

| | Angry | Disgust | Fear | Happy | Neutral | Sad | Surprise |
|---|---|---|---|---|---|---|---|
| Emotion confidence value (612-1) | 0.01 | 0.02 | 0.02 | 0.3 | 0.45 | 0.1 | 0.1 |

Language model (613)

| | Angry | Disgust | Fear | Happy | Neutral | Sad | Surprise |
|---|---|---|---|---|---|---|---|
| Emotion confidence value (613-1) | 0.06 | 0.01 | 0.02 | 0.3 | 0.3 | 0.21 | 0.1 |

(b)

Weight Model for Angry (621)

| | Angry | Disgust | Fear | Happy | Neutral | Sad | Surprise |
|---|---|---|---|---|---|---|---|
| Audio model | 0.7 | 0 | 0.3 | 0.2 | 0.1 | 0.2 | 0.5 |
| Video model | 0.2 | 0.5 | 0.5 | 0.7 | 0.8 | 0.4 | 0.4 |
| Language model | 0.1 (621-1) | 0.5 | 0.2 | 0.1 | 0.1 | 0.4 | 0.1 |

Weight models for Disgust, ..., Surprise Not Shown

(c)

Emotion Model for Angry (631)

| | Angry | Disgust | Fear | Happy | Neutral | Sad | Surprise |
|---|---|---|---|---|---|---|---|
| Emotion confidence value (631-1) | 0.015 | 0.012 | 0.02 | 0.405 | 0.26 | 0.188 | 0.1 |

Emotion Model for Disgust (632)

| | Angry | Disgust | Fear | Happy | Neutral | Sad | Surprise |
|---|---|---|---|---|---|---|---|
| Emotion confidence value | 0.015 | 0.015 | 0.02 | 0.3 | 0.375 | 0.155 | 0.1 |

Emotion Model for Fear (633)

| | Angry | Disgust | Fear | Happy | Neutral | Sad | Surprise |
|---|---|---|---|---|---|---|---|
| Emotion confidence value | 0.035 | 0.015 | 0.02 | 0.345 | 0.345 | 0.155 | 0.1 |

Emotion Model for Happy (634)

| | Angry | Disgust | Fear | Happy | Neutral | Sad | Surprise |
|---|---|---|---|---|---|---|---|
| Emotion confidence value | 0.02 | 0.015 | 0.02 | 0.33 | 0.385 | 0.133 | 0.1 |

Emotion Model for Neutral (635)

| | Angry | Disgust | Fear | Happy | Neutral | Sad | Surprise |
|---|---|---|---|---|---|---|---|
| Emotion confidence value | 0.015 | 0.017 | 0.02 | 0.315 | 0.41 | 0.122 | 0.1 |

Emotion Model for Sad (636)

| | Angry | Disgust | Fear | Happy | Neutral | Sad | Surprise |
|---|---|---|---|---|---|---|---|
| Emotion confidence value | 0.015 | 0.018 | 0.02 | 0.33 | 0.34 | 0.166 | 0.1 |

Emotion Model for Surprise (637)

| | Angry | Disgust | Fear | Happy | Neutral | Sad | Surprise |
|---|---|---|---|---|---|---|---|
| Emotion confidence value | 0.015 | 0.014 | 0.02 | 0.375 | 0.31 | 0.166 | 0.1 |

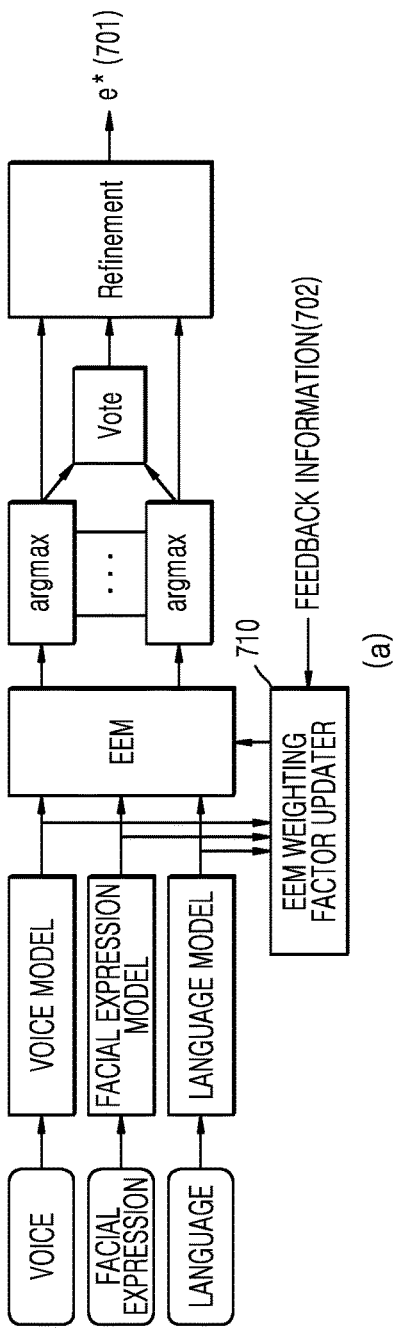
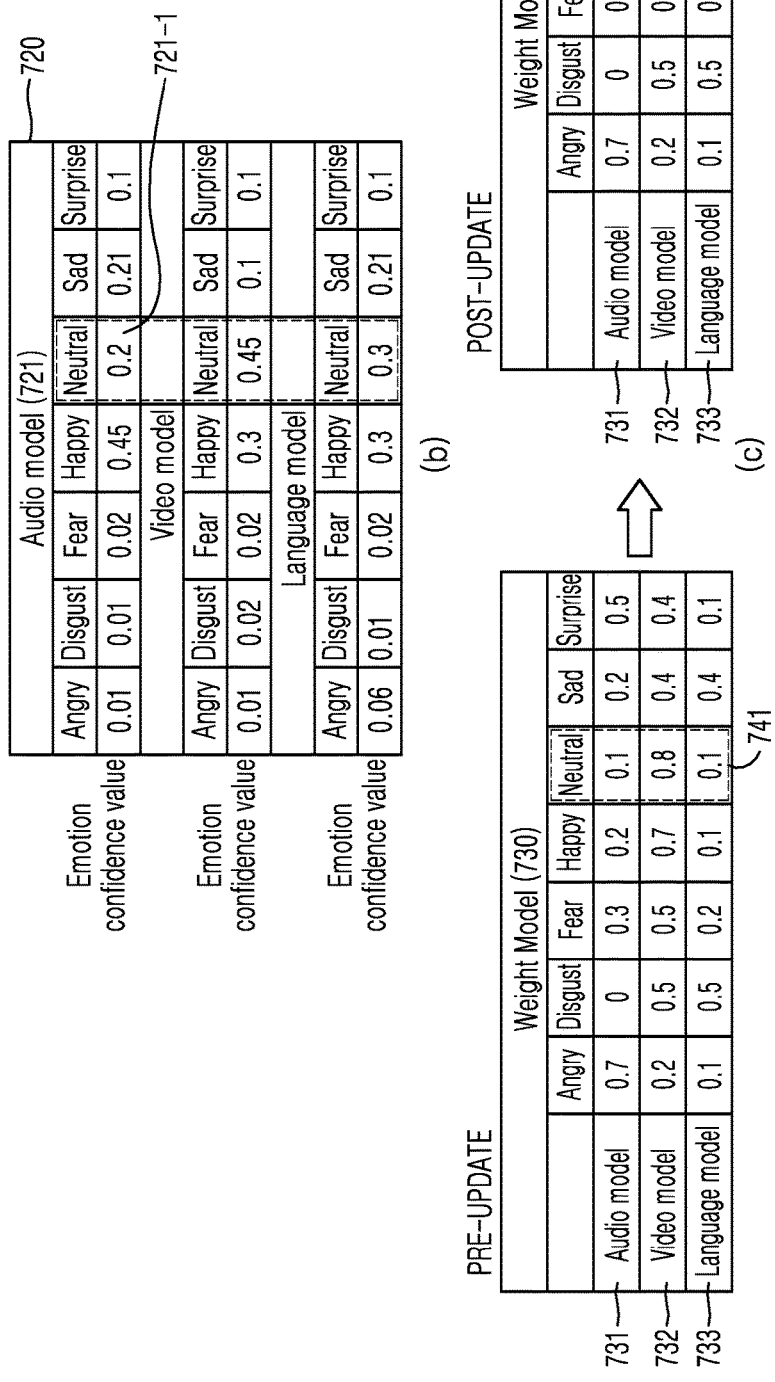
FIG. 7

FIG. 9A
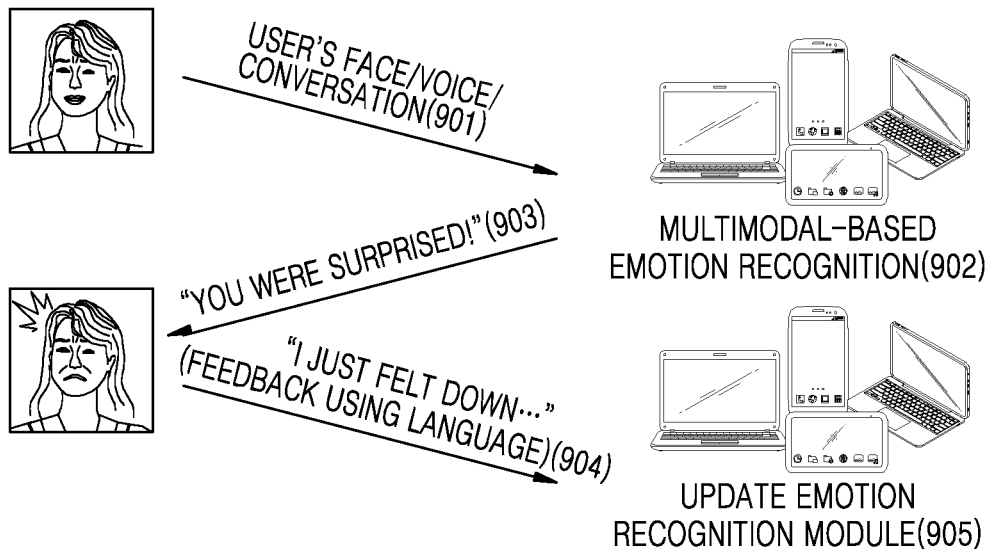
(a)
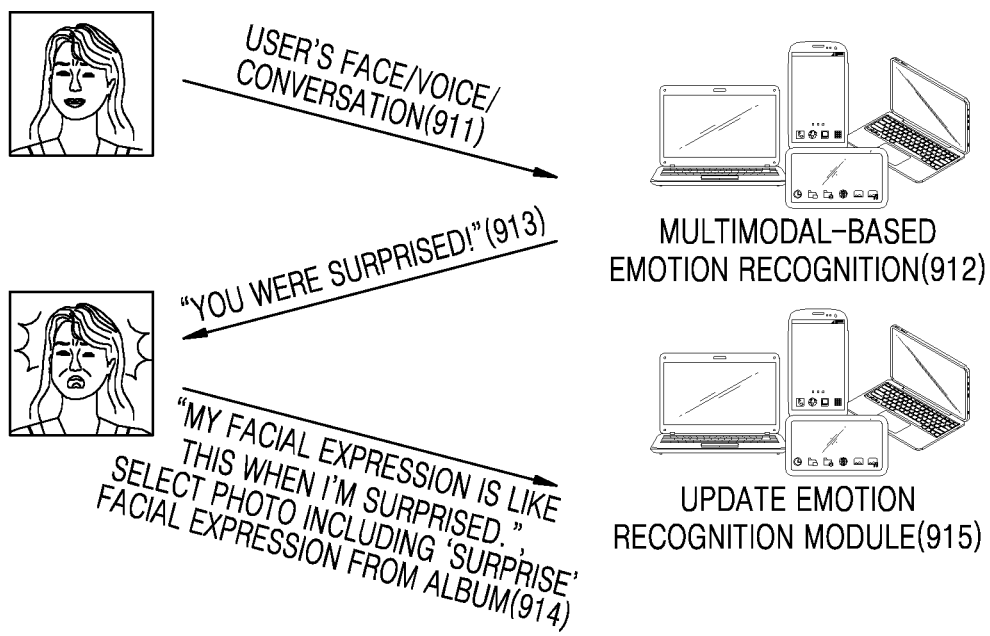
(b)

FIG. 9B
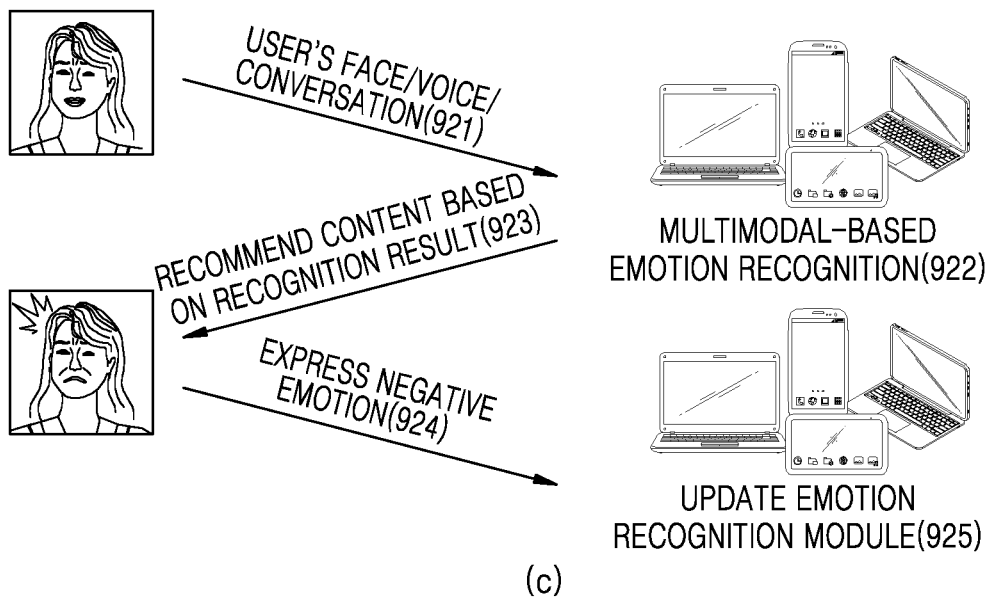
(c)
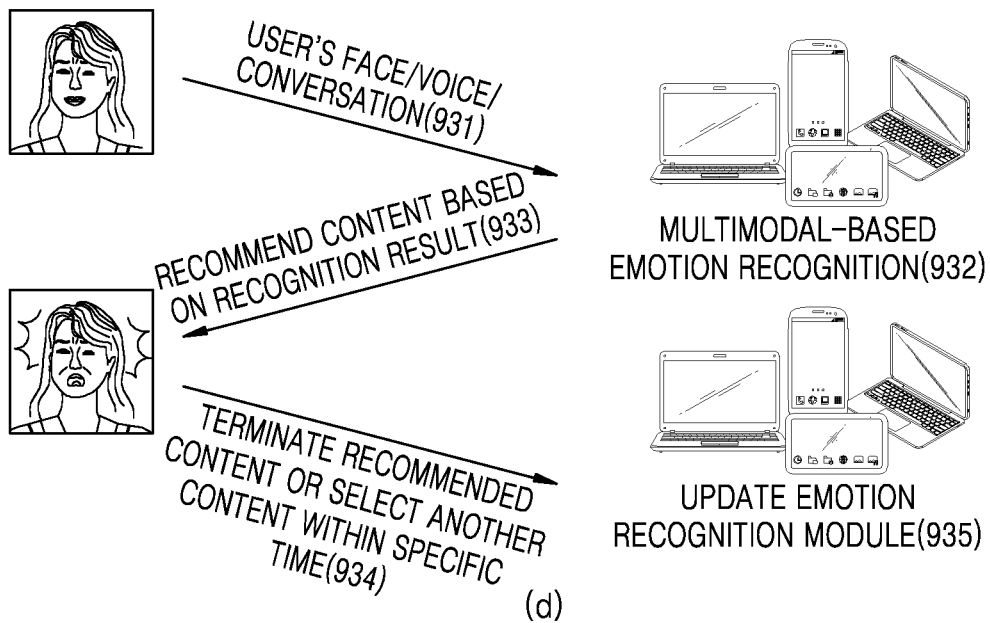
(d)

FIG. 9C
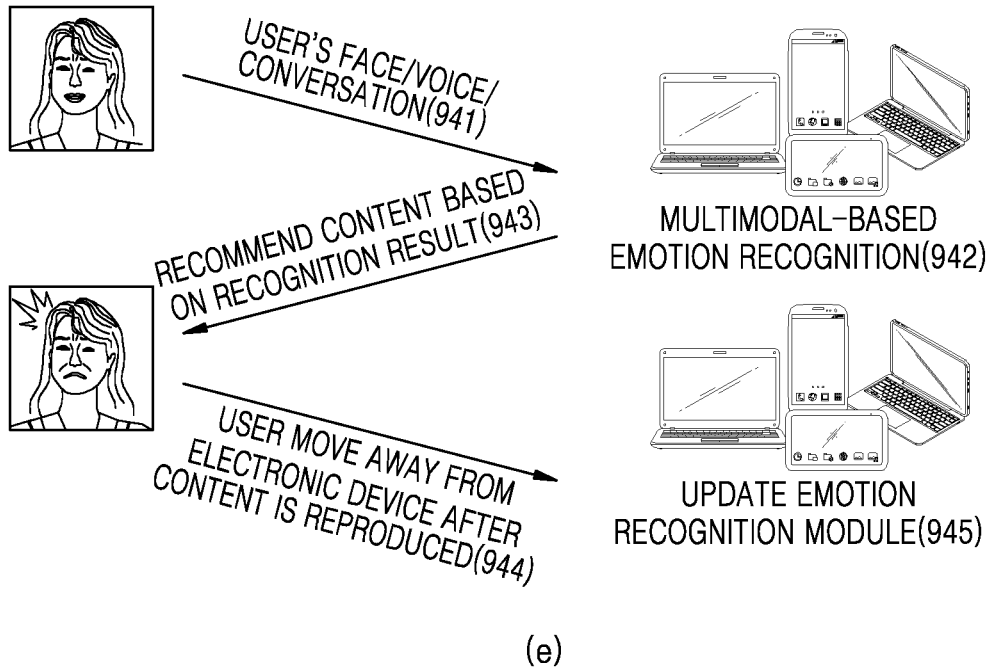
(e)
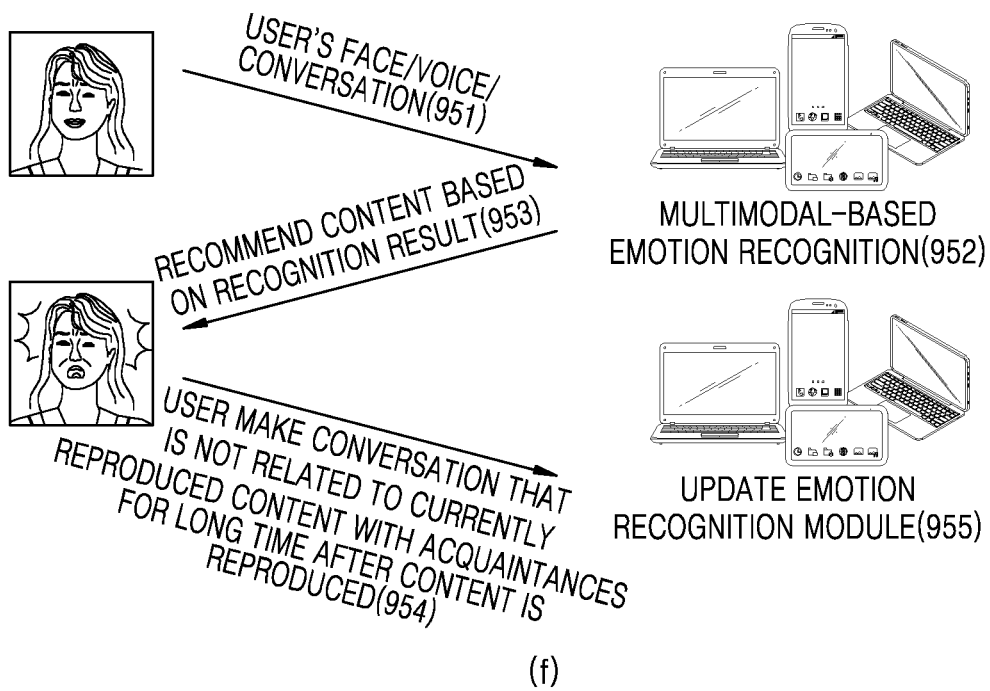
(f)

ELECTRONIC DEVICE AND METHOD OF OBTAINING EMOTION INFORMATION

CROSS-REFERENCE TO RELATED APPLICATION(S)

This application is based on and claims the benefit of U.S. Provisional Patent Application No. 62/738,656, filed on Sep. 28, 2018, in the United States Patent and Trademark Office, and claims priority under 35 U.S.C. § 119 to Korean Patent Application No. 10-2018-0140093, filed on Nov. 14, 2018, in the Korean Intellectual Property Office, the disclosures of which are incorporated herein by reference in their entirety.

BACKGROUND

1. Field

The disclosure relates to an electronic device and a method of obtaining motion information, and more particularly, to an electronic device and a method of obtaining motion information by using multimedia data regarding a person. In particular, the disclosure relates to an electronic device and a method of obtaining motion information regarding a person by using a neural network model learned based on an artificial intelligence (AI) algorithm.

2. Description of the Related Art

An artificial intelligence (AI) system is a computer system that implements human-level intelligence, and allows a machine to self-learn, make decisions, and become smarter, unlike an existing rule-based smart system. The more an AI system is used, the greater its recognition rate and the more accurately a user's taste may be understood. Thus, existing rule-based smart systems have been gradually replaced with deep-learning-based AI systems.

AI technology includes machine learning (e.g., deep learning) and element technologies using machine learning. Machine learning refers to an algorithm technology in which a machine classifies and learns characteristics of input data by itself. Element technologies refer to technologies using a machine learning algorithm, such as deep learning, and may be divided into fields of linguistic understanding, visual understanding, reasoning/prediction, knowledge representation, operation control, etc.

AI technology is employed in various fields. For example, linguistic understanding refers to technology for recognizing, applying, and processing verbal/written language of a human and includes natural language processing, machine translation, a conversation system, question and answer, and voice recognition/synthesis. Visual understanding refers to technology for recognizing and processing objects as in human vision and includes object recognition, object tracking, image search, human recognition, scene understanding, space understanding, image improvement, etc. Reasoning/prediction refers to technology for determining information and executing logical reasoning and prediction and includes knowledge/probability-based reasoning, optimization prediction, preference-based planning, recommendation, etc. Knowledge representation refers to technology for automated processing of human experience information into knowledge data and includes knowledge construction (generating/classifying data), knowledge management (utilizing data), etc. Operation control refers to technology for controlling automated driving of a vehicle and motion of a robot and includes motion control (navigation, collision, driving), manipulation control (behavior control), etc.

Meanwhile, for communication between a person and an electronic device (e.g., an AI system), a human emotional state has to be identified. In this case, to recognize a user's emotion, a neural network model (e.g., a deep-learning model) may be used. Emotion includes, for example, a natural instinctive state of mind deriving from one's circumstances, mood, or relationships with others. Communication includes, for example, the imparting or exchanging of information or news. Application of various forms of multimedia data such as a human voice, etc., as well as a human facial expression to a neural network model enables accurate identification of human emotion.

SUMMARY

When emotion is recognized by applying multimedia data regarding a person to a neural network model, a plurality of neural network models having various modalities for types of multimedia data may be used. For example, a human facial expression may be applied to a neural network model that recognizes a facial expression, and a human voice may be applied to a neural network model that recognizes a voice.

Use of a plurality of neural network models enables emotional recognition customized for human characteristics. For example, when a person (e.g., a user) having obtained a recognized emotion provides feedback, neural network models may be relearned to be personalized or customized for a particular person based on feedback information.

When neural network models are relearned for personalization or customization, significant resources of the electronic device may be consumed. For example, several processing steps are needed for learning of a neural network model, and in a case in which the electronic device includes relatively lightweight hardware (H/W) and software (S/W) resources, like a mobile device, much time and resources may be consumed for learning.

Especially, in a case where neural network models needed for relearning exist in an external server, consumption of a network resource and a privacy issue may occur as the electronic device transmits the feedback information to the external server.

Accordingly, provided are an electronic device and a method of obtaining emotion information.

Additional aspects will be set forth in part in the description which follows and, in part, will be apparent from the description, or may be learned by practice of the presented embodiments of the disclosure.

According to an embodiment of the disclosure, an electronic device includes a memory storing a weight model that adjusts a plurality of predicted values obtained from a plurality of neural network models configured to predict an emotion of a person and at least one processor configured to obtain first multimedia data regarding the person, to obtain a plurality of first predicted values for the person by applying at least a part of the first multimedia data to each of the plurality of neural network models, to obtain first emotion information of the person by applying the plurality of first predicted values to the weight model, to obtain feedback information with respect to the first emotion information of the person, to update the stored weight model by using the feedback information, to obtain second multimedia data regarding the person, and to obtain a plurality of second predicted values for the person by applying at least a part of the second multimedia data to each of the plurality of neural network models and obtain second emotion information of the person by applying the plurality of second predicted values to the weight model updated using the feedback information.

According to another embodiment of the disclosure, a method of obtaining emotion information performed by an electronic device includes obtaining first multimedia data regarding a person, obtaining a plurality of first predicted values for the person by applying at least a part of the first multimedia data to each of a plurality of neural network models configured to predict an emotion of the person, obtaining first emotion information of the person by applying the plurality of first predicted values to a weight model that adjusts predicted values obtained from the plurality of neural network models, obtaining feedback information with respect to the first emotion information of the person, updating the weight model by using the feedback information, obtaining second multimedia data regarding the person, obtaining a plurality of second predicted values for the person by applying at least a part of the second multimedia data to each of the plurality of neural network models, and obtaining second emotion information of the person by applying the plurality of second predicted values to the weight model updated using the feedback information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a continuation of the logic flow of FIG. 5A;

FIG. 6 is an example of models according to an embodiment of the disclosure.

FIG. 7 illustrates a process in which an electronic device updates a weight model, according to an embodiment of the disclosure;

FIG. 9A illustrates scenario in which an electronic device is used, according to an embodiment of the disclosure;

FIG. 9B illustrates scenario in which an electronic device is used, according to an embodiment of the disclosure;

FIG. 9C illustrates scenario in which an electronic device is used, according to an embodiment of the disclosure;

DETAILED DESCRIPTION

Figure 1:
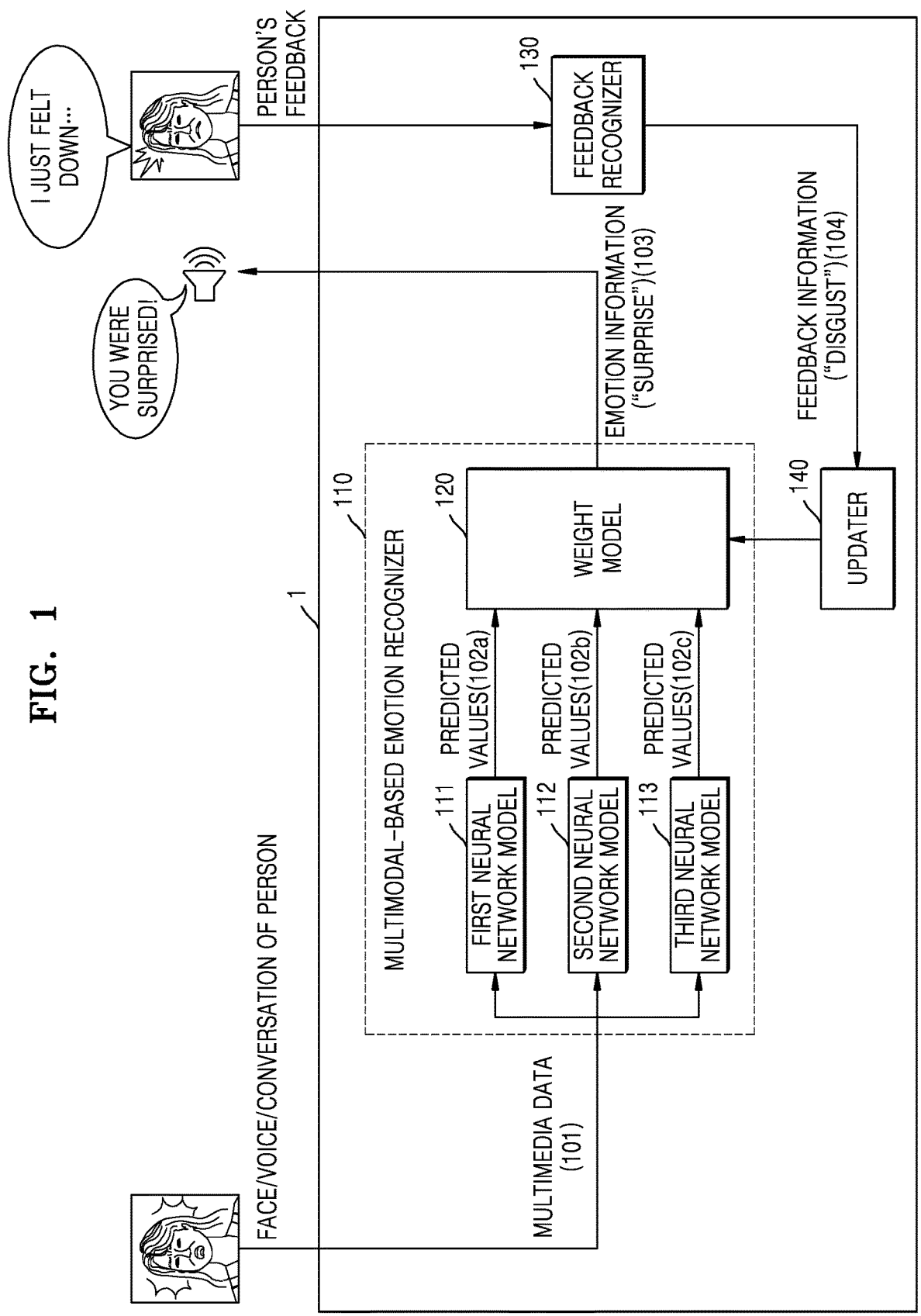
FIG. 1 is a block diagram of an electronic device including a process of predicting an emotion, according to an embodiment of the disclosure.

Throughout the disclosure, the expression "at least one of a, b or c" indicates only a, only b, only c, both a and b, both a and c, both b and c, all of a, b, and c, or variations thereof.

Terms used herein will be described in brief, and the disclosure will be described in detail.

Although terms used in an embodiment of the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Various changes may be made to embodiments of the disclosure and the disclosure may have various embodiments which will be illustrated in the drawings and described in detail in the detailed description. However, the embodiments according to the concept of the disclosure are not construed as limited in scope to specified disclosures, and include all changes, equivalents, or substitutes that do not depart from the spirit and technical scope of the disclosure. In a description of the embodiments of the disclosure, a detailed description of related well-known techniques will be omitted when it obscures the subject matter of the disclosure.

Terms such as first, second, and the like may be used to describe various elements, but the elements should not be limited to those terms. These terms may be used for the purpose of distinguishing one element from another element.

As used herein, the singular forms are intended to include the plural forms as well, unless the context clearly indicates otherwise. It will be further understood that the terms "comprises" and/or "has," when used in this application, specify the presence of a stated feature, number, step, operation, component, element, or combination thereof, but do not preclude the presence or addition of one or more other features, numbers, steps, operations, components, elements, or combinations thereof.

In an embodiment of the disclosure, the term used in the embodiments such as "module" or "unit" indicates a unit for processing at least one function or operation, and may be implemented in hardware, software, or in a combination of hardware and software. The plurality of "modules" or "units" may be implemented with at least one processor by being integrated into at least one module, except for a "module" or "unit" that needs to be implemented with a particular hardware.

In an embodiment of the disclosure, when a part is connected to another part, the part is not only directly connected to another part but also electrically connected to another part with another device intervening in them. Moreover, the connection may include not only physical connection but also wireless connection. When it is assumed that a certain part includes a certain component, the term 'including' means that a corresponding component may further include other components unless a specific meaning opposed to the corresponding component is written.

Hereinafter, embodiments of the disclosure will be described in detail with reference to the attached drawings to allow those of ordinary skill in the art to easily carry out the embodiments. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

Meanwhile, in the disclosure, the terms "human", "human person" and "person" may include an owner or a user of an electronic device, etc.

FIG. 1 is a block diagram of an electronic device that predicts an emotion according to an embodiment of the disclosure.

In FIG. 1, an electronic device 1 may include a multimodal-based motion recognizer 110, a feedback recognizer 130, and an updater 140. The multimodal-based motion recognizer 110, the feedback recognizer 130, and the updater 140 may be a part of at least one processor of the electronic device 1. According to various embodiments of the disclosure, some of the foregoing elements may be provided in an external device (e.g., a server).

In FIG. 1, the electronic device 1 may obtain multimedia data 101 regarding a person (e.g., a user). The multimedia data 101 may include, for example, two or more among image data, video data, audio data, text data, graphic data, and biometric data regarding the person. The multimedia data 101 may be data generated by sensing the user of the electronic device 1 as the user expresses an emotion, or data previously generated and stored. The multimedia data 101 may be data input from an outside through an interface of the electronic device 1. The data generated by sensing the user may be, but not limited to, audio data that is a result of sensing a user's voice or conversation through a microphone, image or video data that is a result of sensing a user's face through a camera, biometric data that is a result of sensing a user's body state through a biometric sensor, etc.

Embodiments provided herein improve communication between a person and an electronic device (e.g., an AI system) by recognizing and/or identifying a human emotional state. To recognize a user's emotion, a neural network model (e.g., a deep-learning model) may be used. As mentioned avove, emotion includes a natural instinctive state of mind deriving from one's circumstances, mood, or relationships with others. Communication includes the imparting or exchanging of information or news. Application of various forms of multimedia data such as a human voice, etc., as well as a human facial expression to a neural network model enables accurate identification of human emotion. Accurate identification of human emotion improves AI services which rely on communication between a human and an electronic device including an AI system.

A variety of information such as language, voice, and facial expression is used, in some embodiments to communicate between a human person and a device including an AI system. A deep learning (DL) model, in some embodiments, recognizes, identifies, or determines an emotion of the human person. In some embodiments, a fusion or combination of information from more than one DL model is used in order to make a final decision in recognizing the emotion of the human person.

The multimodal-based motion recognizer 110 of the electronic device 1 may apply at least a part of the obtained multimedia data 101 to each of a plurality of neural network models (e.g., deep-learning models) 111 through 113, for example, first through third neural network models 111 through 113. The neural network model may be a model learned according to a supervised learning scheme or an unsupervised learning scheme based on an AI algorithm. The neural network model may include a plurality of network nodes having weights, which are located at different depths (or layers) and may transmit and receive data according to a convolution connection relationship. For example, a model such as, but not limited to, a deep neural network (DNN), a recurrent neural network (RNN), a bidirectional recurrent deep neural network (BRDNN), or the like may be used as the neural network model.

In the disclosure, the neural network model is designed to predict a human emotion, and may be, but not limited to a voice model, a vision model, a facial expression model, a language model, a gesture model, a body temperature model, a brainwave model, or the like. In some embodiments the prediction is followed by feedback from the human person.

In FIG. 1 the electronic device 1 receives as input, at the upper left, input based on the face/voice/conversation of a person. The electronic device 1 provides an output, emotion information 103. In an example, the emotion information 103 indicates surprise. The emotion information 103, in some embodiments, is provided to the person. In FIG. 1, the person responds to the emotion information 103 with an expression "I just felt down." The expression provides feedback to the electronic device 1. The expression as received as an input at a feedback recognizer 130. The feedback, in some embodiments, is part of a learning step to update a DL model. How the feedback is processed effects use of a network in communicating with a server. Efficient creation of emotion prediction using weights as provided herein can avoid excessive traffic on the network by simplifying the amount of data transmitted.

In an embodiment of the disclosure, the electronic device 1 may apply audio data of the multimedia data 101 to a voice model and language data of the multimedia data 101 to a language model. In this case, the language data applied to the language model may be data in the form of a text in which audio data is processed by an automatic speech recognition (ASR) module. The electronic device 1 may apply vision data (e.g., image data, video data, etc.) of the multimedia data 101 to the vision model, the facial expression model, or the gesture model. The electronic device 1 may apply biometric data of the multimedia data 101 to the body temperature model or the brainwave model.

The electronic device 1 may obtain predicted values 102a, 102b, and 102c from a plurality of neural network models 111, 112, and 113, respectively, as a result of applying at least a part of the multimedia data 101 to the plurality of neural network models 111, 112, and 113. Although it is illustrated in FIG. 1 that the plurality of neural network models 111 through 113 are included in the electronic device 1, at least one of the plurality of neural network models 111 through 113 may exist in an external device (e.g., a server) connected with the electronic device 1. In this case, the electronic device 1 may transmit at least a part of the multimedia data 101 to an external device and obtain the predicted values 102a, 102b, and 102c from the external device.

The electronic device 1 may obtain emotion information 103 regarding a person by applying the obtained predicted values 102*a*, 102*b*, and 102*c* to a weight model 120. The emotion information may be one of, but not limited to, anger, disgust, fear, happiness, neutrality, sadness, and surprise. In FIG. 1, the electronic device 1 may obtain 'surprise' as the emotion information 103.

The electronic device 1 may provide the obtained emotion information 103 to a user. For example, as the obtained emotion information 103, the electronic device 1 may output a voice that is auditory information through a speaker, display graphics that are visual information through a display, or vibration/temperature/stimulation, etc. that is tactile information. For example, the electronic device 1 may output a sound 'you were surprised!' as a natural language corresponding to the emotion information 103.

Once the emotion information 103 is provided, the user may provide a feedback with respect to the emotion information 103. For example, the user may speak 'I just felt down'. Feedback includes, for example, information about reactions to a product, a person's performance of a task, etc. which are used as a basis for improvement.

The feedback recognizer 130 of the electronic device 1 may obtain user's feedback information 104 by applying a user's feedback to at least one of a plurality of neural network models (e.g., the plurality of neural network models 111 through 113 of the electronic device 1). According to various embodiments of the disclosure, at least one of the plurality of neural network models 111 through 113 may exist in an external device (e.g., a server) connected with the electronic device 1. In this case, the electronic device 1 may transmit a user's feedback to an external device and obtain the feedback information 104 from the external device.

For example, the feedback recognizer 130 of the electronic device 1 may obtain 'disgust' as the user's feedback information 104 by applying audio data, which is a result of sensing user's utterance, to a voice model or a language model. The updater 140 of the electronic device 1 may update the weight model 120 by using the feedback information 104 obtained from the feedback recognizer 130.

In a case of updating the weight model 120 by reflecting the user's feedback, the electronic device 1 may evolve to a user-customized device capable of accurately recognizing a user's emotion. That is, once additional multimedia data regarding the user is obtained, the electronic device 1 may accurately predict the user's emotion.

More specifically, the electronic device 1 may obtain new multimedia data regarding a person (e.g., a user). In the case of obtaining the new multimedia data, the electronic device 1 may apply the new multimedia data to each of the plurality of neural network models 111 through 113.

The electronic device 1 may obtain new predicted values from a plurality of neural network models 111, 112, and 113, respectively, as a result of applying at least a part of the multimedia data 101 to the plurality of neural network models 111, 112, and 113. The electronic device 1 may obtain new emotion information regarding the user by applying the obtained new predicted values to the weight model 120 updated by the updater 140.

The electronic device 1 may provide the obtained new emotion information to the user. For example, the electronic device 1 may provide auditory, visual, or tactile information as the new emotion information.

Figure 2:
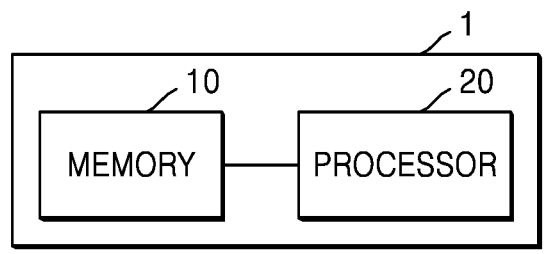
FIG. 2 is a block diagram of an electronic device according to an embodiment of the disclosure.

FIG. 2 is a block diagram of an electronic device according to an embodiment of the disclosure.

As shown in FIG. 2, the electronic device 1 may include a memory 10 and a processor 20.

The electronic device 1 according to the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In various embodiments of the disclosure, the electronic device 1 may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™, Playsatation™), an electronic dictionary, an electronic key, a camcorder, and an electronic frame.

In other embodiments of the disclosure, the electronic device 1 may include at least one of various medical equipment (for example, various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation device, a global navigation satellite system (GNSS), an event data recorder (EDR), a flight data recorder (FDR), a vehicle infotainment device, electronic equipment for ships (e.g., a navigation system for ships and gyro compass), avionics, a security device, a head unit for vehicle, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to another embodiment of the disclosure, the electronic device 1 may include a part of a furniture, building/structure or a part of a vehicle, an electronic board, an electronic signature receiving device, a projector, and various measuring instruments (e.g., a water, electricity, gas, electric wave measuring device, etc.).

In FIG. 2, in the memory 10, various operating systems (OSs) for driving the electronic device 1 may be stored, and various software programs (or applications) for operations of the electronic device 1 and data and instructions for operations of the electronic device 1 may be stored. At least a part of a program may be downloaded from an external server through wireless or wired communication. The memory 10 may be implemented with a non-volatile memory, a volatile memory, a flash-memory, a hard disk drive (HDD), a solid state drive (SSD), etc. The memory is accessed by the processor 20, and reading/writing/modification/deletion/updating of data may be performed by the processor 20.

Multimedia data regarding a person may be stored in the memory 10. The memory 10 may include a plurality of software modules for predicting a person's emotion. A plurality software modules may include a plurality neural network models. For example, the neural network models may be downloaded from a server based on user characteristic information using the electronic device 1 and may be stored in the memory 10. The memory 10 may store a weight model for adjusting predicted values obtained from the plurality of neural network models configured to predict a user's emotion.

The processor 20 may control the above-described components of the electronic device 1. For example, the processor 20 may predict a user's emotion by using the plurality of software modules stored in the memory 10 or obtain emotion information regarding the user.

In the disclosure, the processor 20 may copy various programs stored in the memory 10 to a random access memory (RAM) and execute the programs to perform various operations. Although it has been described that the processor 20 includes one CPU in the disclosure, the processor 20 may also be implemented with a plurality of CPUs (or a digital signal processor (DSP), a system on chip (SoC), etc.). In particular, the processor 20 may include a dedicated neural processing unit optimized to use an AI model learned to recognize a person's emotion. According to various embodiments of the disclosure, the processor 20 may be implemented as a Digital Signal Processor (DSP) that processes a digital signal, a microprocessor, or a time controller (TCON). However, the processor 20 is not limited to the above examples, and may include one or more of a central processing unit (CPU), a micro controller unit (MCU), a micro processing unit (MPU), a controller, an application processor (AP), a communication processor (CP), and an ARM processor, or may be defined as a corresponding term. The processor 20 may be implemented with an SoC having a processing algorithm embedded therein, large scale integration, or a field programmable gate array.

In various embodiments of the disclosure, the processor 20 may obtain first multimedia data regarding a person. The processor 20 may obtain a plurality of first predicted values for a person by applying at least a part of the first multimedia data to each of a plurality of neural network models. The plurality of neural network models may be selectively downloaded from the external server based on person's characteristic information. The processor 20 may obtain first emotion information of a person by applying the plurality of first predicted values to a weight model. The processor 20 may obtain feedback information corresponding to the first emotion information of the person and update a stored weight model by using the feedback information. In a situation where the weight model is updated, the processor 20 may obtain second multimedia data regarding the person and obtain a plurality of second predicted values for the person by applying at least a part of the second multimedia data to each of the plurality of neural network models. The processor 20 may obtain second emotion information of the person by applying the plurality of second predicted values to the weight model updated using the user's feedback information.

In various embodiments of the disclosure, in the case of updating the weight model, the processor 20 may update a weight value of an emotion corresponding to feedback information in the weight model.

According to various embodiments of the disclosure, the weight model may include a weight value to be applied to predicted values obtained from a plurality of deep-learning models classified by emotion.

According to various embodiments of the disclosure, in the case of obtaining first emotion information of a person by applying a plurality of first predicted values to the weight model, the processor 20 may generate a plurality of emotion models, each of which includes confidence values for a plurality of emotions, by applying the plurality of first predicted values to the weight model and obtain the first emotion information of the person based on the confidence values for the plurality of emotions included in the plurality of emotion models.

According to various embodiments of the disclosure, in the case of obtaining the first emotion information of the person based on the confidence values for the plurality of emotions included in the plurality of emotion models, the processor 20 may obtain the person's first emotion information based on emotion candidates having maximum values among the confidence values for the plurality of emotions included in the plurality of emotion models.

According to various embodiments of the disclosure, in the case of obtaining the first emotion information of the person based on the confidence values for the plurality of emotions included in the plurality of emotion models, the processor 20 may obtain the person's first emotion information based on emotion candidates having maximum values among the confidence values for the plurality of emotions included in the plurality of emotion models.

According to various embodiments of the disclosure, in the case of obtaining the first emotion information of the person based on the emotion candidates having the maximum value among the confidence values for the plurality of emotions included in the plurality of emotion models, the processor 20 may obtain a major emotion candidate having most votes among the emotion candidates having the maximum values, as the first emotion information of the person. In some embodiments, each emotion candidate having the maximum value for a given emotion model is accorded one vote to be cast.

According to various embodiments of the disclosure, the processor may obtain feedback information by applying a user's feedback to at least one of a plurality of neural network models. The feedback information may include at least one of person's voice, facial expression, action, or biometric change.

Figure 3:
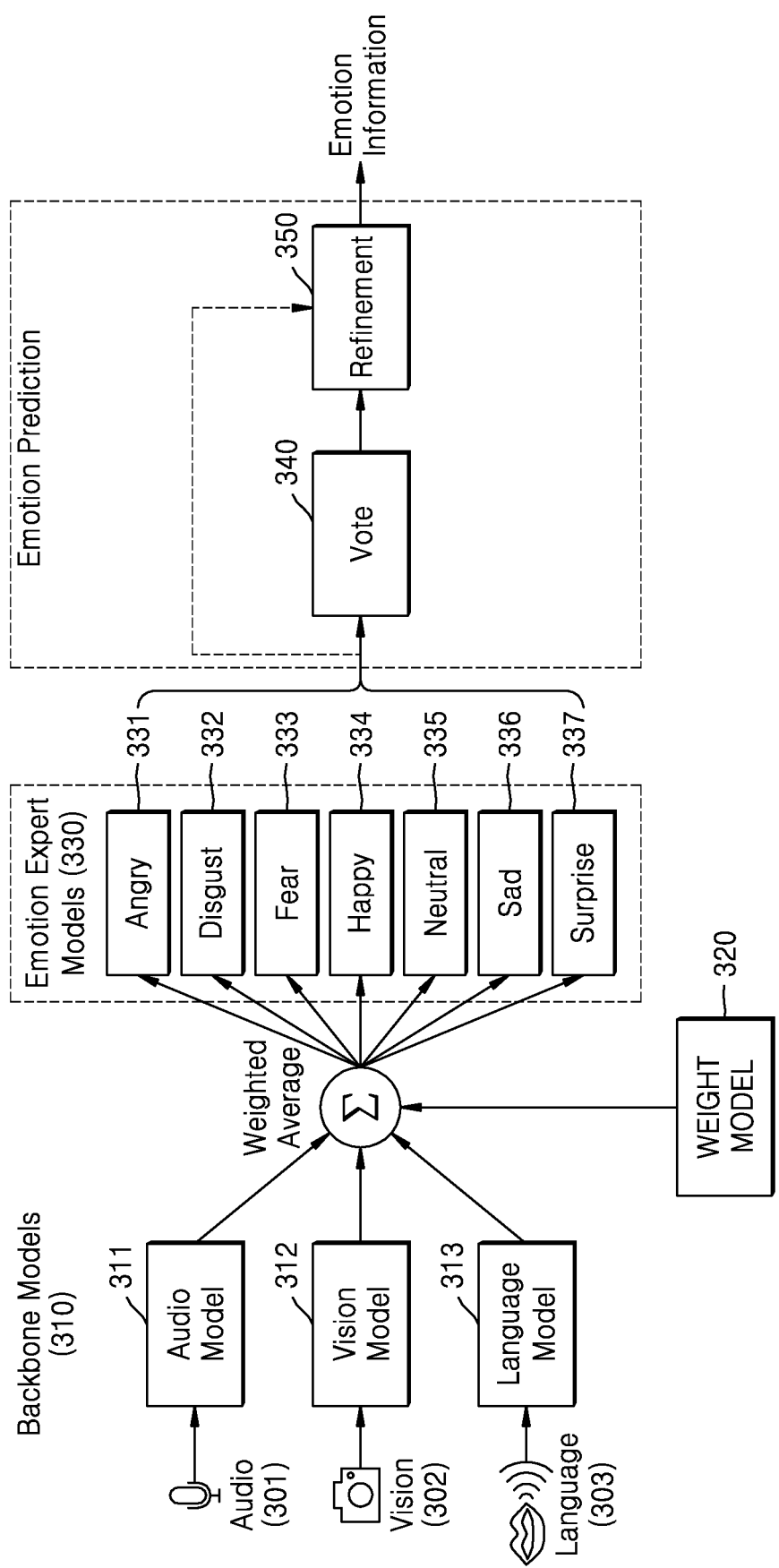
FIG. 3 illustrates a process in which an electronic device predicts an emotion, according to an embodiment of the disclosure.

FIG. 3 illustrates a process in which an electronic device predicts an emotion according to an embodiment of the disclosure.

Referring to FIG. 3, the electronic device 1 may obtain multimedia data. The multimedia data may include, for example, audio data 301, vision data 302, and language data 303. The language data may be data in the form of a text in which audio data is processed by an ASR module.

The electronic device 1 may apply multimedia data to backbone models 310 according to each modality of data included in the multimedia data. The backbone models 310 may include an audio model 311, a vision model 312, and a language model 313. The electronic device 1 may apply the audio data 301 to the audio model 311, the vision data 302 to the vision model 312, and the language data 303 to the language model 313.

As a result of application, the electronic device 1 may obtain predicted values for respective emotions from each of the backbone models 310. The predicted value may include a probability for each emotion or a confidence value for each emotion.

The electronic device 1 may generate emotion models (or emotion expert models) 330 by applying a weight value included in the weight model 320 to the predicted value for each emotion. The emotion models 330 may include each model capable of identifying each emotion well. For example, an expert model 331 for 'Angry' may mean a model capable of identifying the angry emotion best, an expert model 332 for 'Disgust' may mean a model capable of identifying the disgust emotion best, an expert model 333 for 'Fear' may mean a model capable of identifying the fearful emotion best, an expert model 334 for 'Happy' may mean a model capable of identifying the happy emotion best, an expert model 335 for 'Neutral' may mean a model capable of identifying the neutral emotion best, an expert model 336 for 'Sad' may mean a model capable of identifying the sad emotion best, and an expert model 337 for 'Surprise' may mean a model capable of identifying the surprised emotion best.

Next, the electronic device 1 may obtain emotion information regarding the user by using output values provided by the emotion models 330. For example, the electronic device 1 may obtain an emotion corresponding to a maximum value for each of the emotion models 330 as an emotion candidate. The electronic device 1 may vote 340 the obtained emotion candidates. The electronic device 1 may select an emotion candidate having most votes among the obtained emotion candidates as a result of the voting. The electronic device 1 may identify whether the selected emotion candidate matches an emotion corresponding to a maximum value, sorted from an emotion model corresponding to the selected emotion candidate.

In a case where the selected emotion candidate matches the sorted emotion corresponding to the maximum value, the electronic device 1 may obtain the selected emotion candidate as final emotion information regarding the person.

On the other hand, in a case where the selected emotion candidate does not match the emotion corresponding to the maximum value, the electronic device 1 may obtain the final emotion information through refinement 350. For example, the electronic device 1 may select a next emotion candidate voted next most except for the selected emotion candidate having most votes. The electronic device 1 may identify whether the next emotion candidate matches an emotion corresponding to a maximum value, sorted from an emotion model corresponding to the next emotion candidate. In a case where the next emotion candidate matches the sorted emotion corresponding to the maximum value, the electronic device 1 may obtain the next emotion candidate as final emotion information regarding the person.

Figure 4:
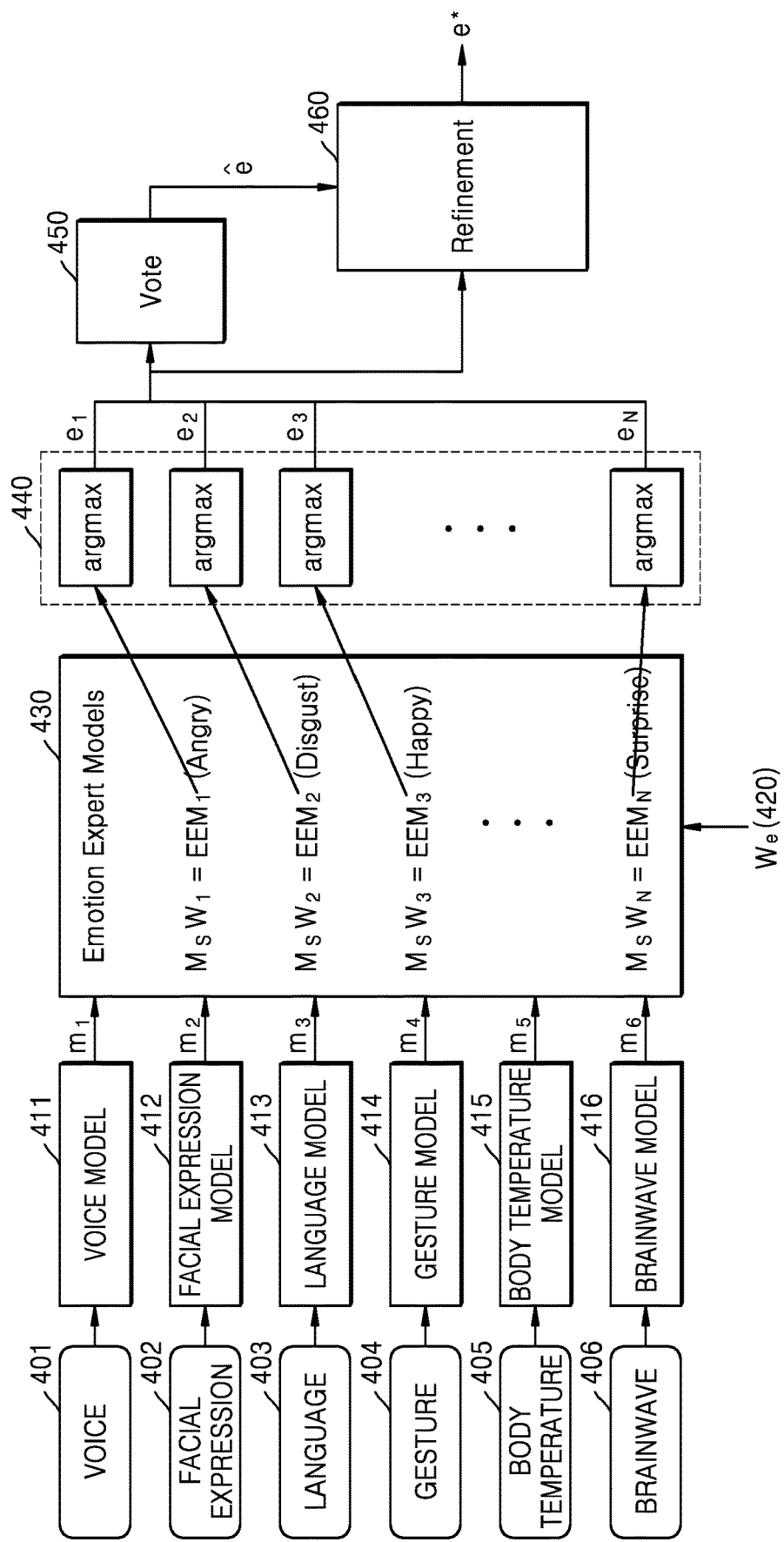
FIG. 4 illustrates a process in which an electronic device predicts an emotion, according to another embodiment of the disclosure.

FIG. 4 illustrates a process in which the electronic device 1 predicts an emotion according to another embodiment of the disclosure.

Referring to FIG. 4, the electronic device 1 may obtain multimedia data. The multimedia data may include, for example, at least one of voice data 401, facial expression data 402, language data 403, gesture data 404, body temperature data 405, or brainwave data 406.

The electronic device 1 may apply multimedia data to neural network models according to each modality of data included in the multimedia data. The neural network models may include, for example, at least one of a voice model 411, a facial expression model 412, a language model 413, a gesture model 415, a body temperature model 416, or a brainwave model 417.

As a result of the application, the electronic device 1 may obtain a matrix $M_S=[m_1, m_2, m_3, m_4, m_5, m_6]^T$ which includes confidence values for respective emotions of neural network models and have dimensions of $N_e \times N_x$. Herein, $m_x$ may be an output value of the neural network models, for example, $m_1=[0.1, 0.2, 0.3, 0.1, 0.1, 0.2, 0.0]$. Herein, $N_e$ indicates the number of emotions, and $N_x$ may be the number of neural network models.

Next, the electronic device 1 may generate a matrix $M^e_{emm}$ which includes emotion models (or emotion expert models) 430 by applying a weight model $W_e$ 420 to the confidence values for the respective emotions. Each emotion model may provide a new confidence value optimized for each emotion. The emotion models may be indicated by the matrix $M^e_{emm}=M_S \times W_e$, and each emotion model may have dimensions of $N_e \times 1$.

In this case, $W_e$ may be a weighting factor matrix for emotion models, as a weight model. $W_e$ may be extracted, for example, by a greedy search method. To find an optimal $W_e$, a weighting factor for providing the highest accuracy for a targeted emotion e may be selected for each neural network model. For example, $W_1=\{0.1, 0.3, 0.1, 0.1, 0.1, 0.3\}$.

More specifically, in a case where the neural network models include two vision models and one audio model, three weighting factors for the targeted emotion e may be selected from the emotion model. That is, for the targeted emotion e, $W_e=\{w^{v0}_e, w^{v1}_e, w^a_e\}$, and v0, v1, and a may indicate two vision models, and one audio model, respectively.

Referring to FIG. 4, in emotion expert models 430, an emotion model for 'Angry' may be expressed as $EEM_1=M_S \times W_1$, an emotion model for 'Disgust' may be expressed as $EEM_2=M_S \times W_2$, an emotion model for 'Happy' may be expressed as $EEM_3=M_S \times W_3$, and an emotion for 'Surprise' may be expressed as $EEM_N=M_S \times W_N$, respectively. For example, $EEM_1=[0.1, 0.2, 0.5, 0.0, 0.0, 0.2, 0.0]$.

Next, the electronic device 1 may sort a maximum value for each emotion expert model, as indicated by 440, among confidence values of respective emotions included in each emotion expert model. Thus, an emotion corresponding to a confidence value having a maximum value for each emotion expert model may be obtained as an emotion candidate. For example, an emotion candidate selected from an $i^{th}$ emotion expert model may be expressed as $e^{m_i}=\mathrm{argmax}\{M^i_{emm}\}$.

Referring to FIG. 4, $e_1$ may indicate an emotion candidate obtained from $EEM_1$, $e_2$ may indicate an emotion candidate obtained from $EEM_2$, $e_3$ may indicate an emotion candidate obtained from $EMM_3$, and an $e_N$ may indicate an emotion candidate obtained from $EMM_N$.

Next, the electronic device 1 may vote selected $N_e$ emotion candidates as indicated by 450. For example, a result of the voting may include 1 through $N_e$. According to majority voting, the electronic device 1 may select an emotion candidate $e^m$ voted most (or having most votes). The electronic device 1 may determine the selected emotion candidate $e^m$ as emotion information regarding a person.

In another embodiment of the disclosure, the electronic device 1 may select the most voted emotion candidate $e^m$ having a confidence value greater than or equal to a threshold value among the confidence values for the respective emotions of the emotion expert models 430.

In another embodiment of the disclosure, the electronic device 1 may sum confidence values greater than or equal to a threshold value among the confidence values for the respective emotions of the emotion expert models 430, and select an emotion corresponding to a confidence value having the greatest summation value as the emotion candidate $e^m$.

Additionally, the electronic device 1 may identify final emotion information e* regarding a person through refinement 460. An example of identifying the final emotion information e regarding the person through a refinement function will be described in more detail with reference to the flowchart of FIGS. 5A-5B.

Figure 5A:
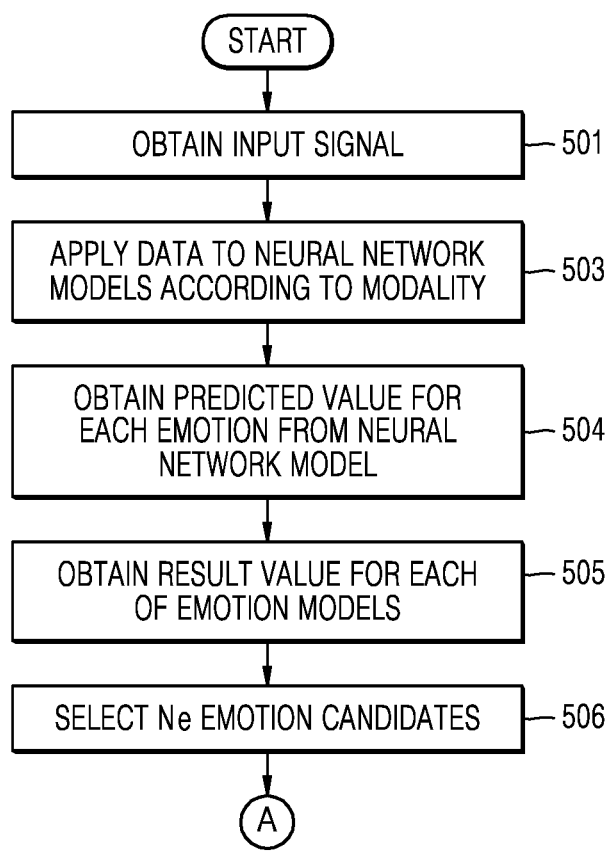
FIG. 5A is a first flowchart of a process by which an electronic device predicts an emotion, according to an embodiment of the disclosure.
Figure 5B:
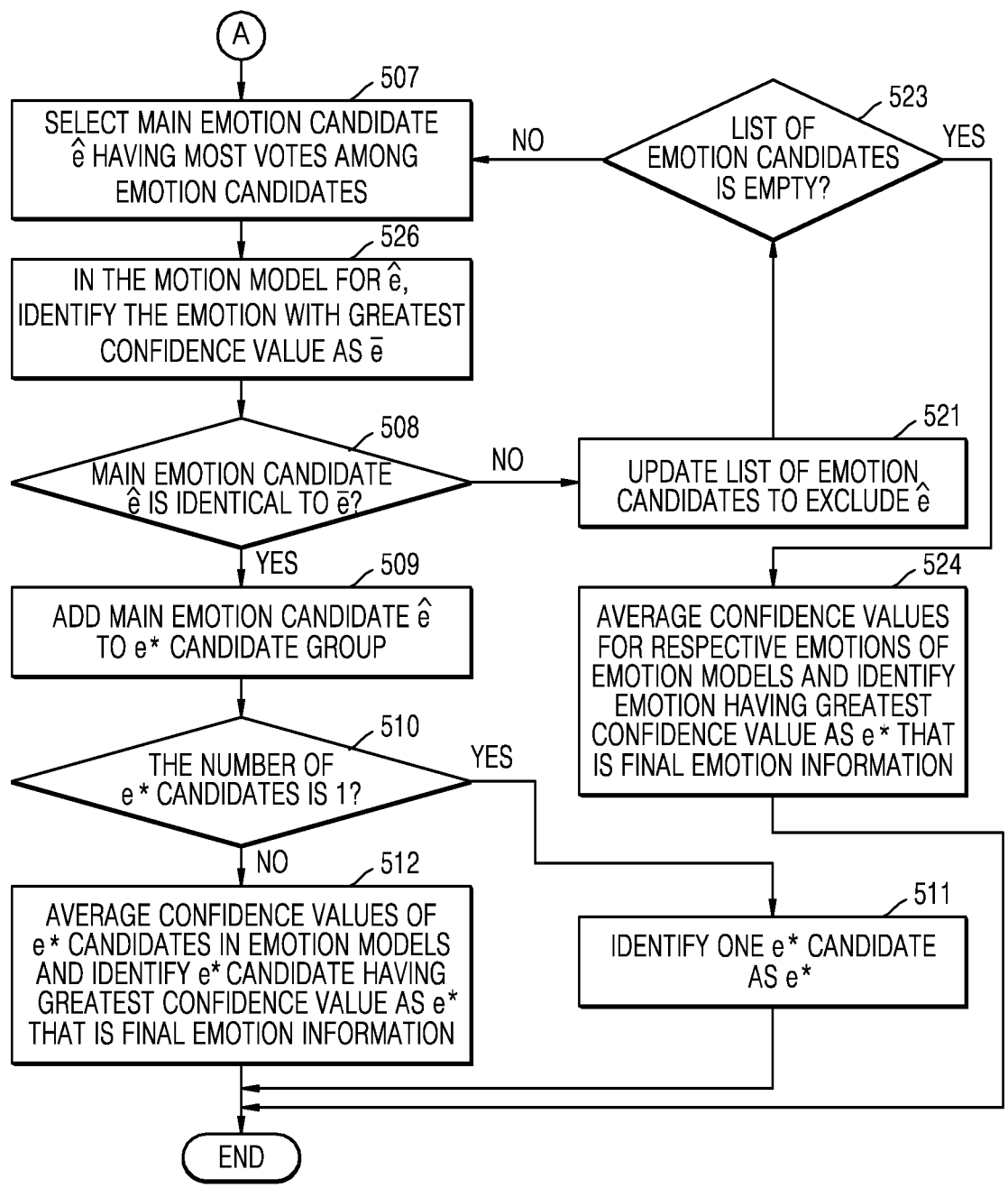
FIG. 5B is a second flowchart of a process by which an electronic device predicts an emotion, according to an embodiment of the disclosure.

FIGS. 5A and 5B are flowcharts of a process by which an electronic device predicts an emotion according to an embodiment of the disclosure.

Referring to FIGS. 5A-5B, the electronic device 1 may obtain an input signal in operation 501. For example, the electronic device 1 may obtain multimedia data as the input signal.

The electronic device 1 may apply data included in the obtained multimedia data to neural network models according to modality of the data in operation 503.

The electronic device 1 may obtain as a result of the application, a predicted value (or a confidence value or a probability value) for each emotion from the neural network models in operation 504. The predicted value may range from 0 to 1.0.

For example, (a) of FIG. 6 illustrates an example of a predicted value for each emotion, obtained from the neural network models. The electronic device 1 may obtain an emotion-specific predicted value 611-1 as a result of applying audio data to an audio model 611. The emotion-specific predicted value 611-1 for the audio model 611 may include, for example, {Angry, 0.01}, {Disgust, 0.01}, {Fear, 0.02}, {Happy, 0.45}, {Neutral, 0.2}, {Sad, 0.21}, and {Surprise, 0.1}. In another example, the electronic device 1 may obtain an emotion-specific predicted value 612-1 as a result of applying vision data to a vision model 612. In another example, the electronic device 1 may obtain an emotion-specific predicted value 613-1 as a result of applying language data to a language model 613.

Once a predicted value for each of a plurality of emotions for each of a plurality of neural network models is obtained, the electronic device 1 may apply a weight model to the obtained predicted value for each emotion.

For example, (b) of FIG. 6 illustrates an example of weight models (or weighting factors). The weight model may include, for example, a rate of each of a plurality of neural network models used for identifying a particular emotion. For example, in (b) of FIG. 6, weight values (or weight rates) of a plurality of neural network models for 'Angry' 621 may be {Audio model, 0.7}, {Video model, 0.2}, and {Language model, 0.1}. In this case, the weight model may be a model generated already through learning. For example, the weight model may be a model selected based on characteristics (e.g., a gender, an age, a region, a habit, etc.) of a user of the electronic device 1. The weight model may be downloaded and installed from a server during registration of the user of the electronic device 1 or installation of an application related to an embodiment of the disclosure.

The electronic device 1 may generate a plurality of emotion models (or emotion expert models) as a result of applying a weight model to predicted values for each of the plurality of emotions. Each emotion model may mean a model capable of identifying a particular emotion best. Each emotion model may include a confidence level for each of a plurality of emotions.

For example, (c) of FIG. 6 shows a plurality of emotion models. In (c) of FIG. 6, an emotion model 631 for 'Angry' may include probability values 631-1 for Angry, which are products of the predicted values for the neural network models in (a) of FIG. 6 and the weight values for 'Angry' 621 in (b) of FIG. 6.

More specifically, in a case where the predicted values for the neural network models for 'Angry' are {Audio model, 0.01}, {Video model, 0.01}, and {Language model, 0.06} in (a) of FIG. 6, the predicted values may be subject to a matrix operation with the weight values for 'Angry' 621, {Audio model, 0.7}, {Video model, 0.2}, and {Language model, 0.1} in (b) of FIG. 6. A probability value for 'Angry' in the emotion model 631 for 'Angry' as a result of the matrix operation may be '0.015' as in (c) of FIG. 6. Similarly, in a case where the predicted values for the neural network models for 'Disgust' are {Audio model, 0.01}, {Video model, 0.02}, and {Language model, 0.01} in (a) of FIG. 6, the predicted values may be subject to a matrix operation with the weight values for 'Angry' 621, {Audio model, 0.7}, {Video model, 0.2}, and {Language model, 0.1} in (b) of FIG. 6. A probability value for 'Disgust' in the emotion model 631 for 'Angry' as a result of the matrix operation may be '0.012' as in (c) of FIG. 6.

In some embodiments, each emotion model is accorded one vote to be cast. In the example of FIG. 6(c), each of the models numbered 631, 631, . . . 637 would have one vote to cast. Thus, for this example, the total number of votes cast would be seven.

Once the emotion models are generated using the weight model, the electronic device 1 may obtain a result value for each of the generated emotion models in operation 505. The result value may be, for example, a confidence value for each of the emotions included in each emotion model.

The electronic device 1 may select $N_e$ emotion candidates among confidence values for the respective emotions in operation 506.

Upon selecting the emotion candidates, the electronic device 1 may select a main emotion candidate $e^{[<]BEGINITALm}$ having most votes among the emotion candidates in operation 507 of FIG. 5B (FIG. 5B is the continuation of FIG. 5A, as shown by operation 506 of FIG. 5A leading to the the notation "A" and operation 507 of FIG. 5B being point to by the notation "A." Each emotion model, in some embodiments, is accorded one vote. For example, the electronic device 1 may sort a confidence value having a maximum value for each emotion model. Referring to (c) of FIG. 6, an emotion having the greatest confidence value in the expert model 631 for 'Angry' is {Happy, 0.405}, an emotion having the greatest confidence value in the expert model 632 for 'Disgust' is {Neutral, 0.375}, an emotion having the greatest confidence value in the expert model 633 for 'Fear' is {Happy, 0.345} and {Neutral, 0.345}, an emotion having the greatest confidence value in the expert model 634 for 'Happy' is {Neutral, 0.385}, an emotion having the greatest confidence value in the expert model 635 for 'Neutral' is {Neutral, 0.41}, an emotion having the greatest confidence value in the expert model 636 for 'Sad' is {Neutral, 0.34}, and an emotion having the greatest confidence value in the expert model 637 for 'Surprise' is {Happy, 0.375}. In this case, Neutral has 5 votes and Happy has 3 votes. Neutral is selected as the main emotion candidate $e^{[<]BEGINITALm}$. That is the electronic device 1 after counting the number of emotion candidates sorted from each of the emotion models 631 through 637 and selects 'Neutral' because 'Neutral,' voted 5 times, corresponds to the greatest number of votes as a main emotion candidate $e^{[<]BEGINITALm}$.

Once the main emotion candidate $e^{[<]BEGINITALm}$ is selected, the electronic device 1 may identify whether the selected main emotion candidate e" is identical to e⁻ in operation 508. e⁻, see operation 526 of FIG. 5B ("in the motion model for $e^{[<]BEGINITALm}$, identify the emotion with greatest confidence value as e⁻"), may be a representative emotion having the greatest confidence value in an emotion model $M^{[<]BEGINITALm^i}_{emm}$ corresponding to the selected emotion candidate $e^{[<]BEGINITALm}$. For example, in FIG. 6(c), at item 635, the maximum confidence value is 0.41 and it is associated with Neutral, thus e⁻ corresponds to Neutral and e⁻ is equal to $e^{[<]BEGINITALm}$.

Generally, in a case where the selected emotion candidate $e^{[<]BEGINITALm}$ is identical to $e^-$ (Yes) in operation 508, the electronic device 1 may add the main emotion candidate $e^{[<]BEGINITALm}$ to an e* candidate group that is emotion information regarding a person in operation 509.

The electronic device 1 may identify whether the number of e* candidates included in the e* candidate group is 1 in operation 510.

In a case where the number of e* candidates is 1 (Yes) in operation 510, the electronic device 1 may identify one e candidate as e* that is final emotion information regarding a person in operation 511.

For example, referring to (c) of FIG. 6, the electronic device 1 may select 'Neutral' as a result of voting the emotion candidates sorted from each of the emotion models 631 through 637. In this case, the electronic device 1 may identify whether an emotion having the greatest confidence value in the expert model 635 for 'Neutral' is also 'Neutral'. In a case where two emotions match each other, the electronic device 1 may identify 'Neutral' as final emotion information regarding a person.

Meanwhile, in a case where the number of e candidates is plural (No) in operation 510, the electronic device 1 may average confidence values of e* candidates included in the emotion models and identify an e* candidate having the greatest confidence value as e* that is the final emotion information.

According to various embodiments of the disclosure, in operation 508, the selected emotion candidate $e^{[<]BEGINITALm}$ may not be identical to $e^-$ (No). In this case, the electronic device 1 may update a list of emotion candidates to exclude the main emotion candidate $e^{[<]BEGINITALm}$ in operation 521. Thus, despite winning a vote, an emotion candidate may be excluded in some instances. In a case where the list of emotion candidates is not empty as a result of the updating (No) in operation 523, the electronic device 1 may reselect the main emotion candidate $e^{[<]BEGINITALm}$ having most votes from among the emotion candidates included in the list and repeat the above-described operations 507 through 512.

Referring to (c) of FIG. 6, while an emotion having most votes as a result of voting the emotion candidates is 'Neutral', an emotion having the greatest confidence value in the expert model 635 for 'Neutral' may not be 'Neutral', but 'Happy'. In this case, the electronic device 1 may select an emotion voted next most as the result of voting the emotion candidates and repeat the above-described operations 507 through 512 with respect to the selected emotion.

Meanwhile, in a case where the list of emotion candidates is empty as the result of updating the list of the emotion candidates (Yes) in operation 523, the electronic device 1 may average confidence values for respective emotions included in each of the emotion models and identify an emotion having the greatest confidence value as e* that is the final emotion information in operation 524.

FIG. 7 illustrates a process in which an electronic device updates a weight model according to an embodiment of the disclosure.

Referring to (a) of FIG. 7, the electronic device 1 may recognize multimedia data and provide emotion information e*. A process for the electronic device 1 to determine e* has been described above with reference to FIGS. 4 and 5, and thus a repetitive description thereof will be avoided.

In FIG. 7, once a feedback to emotion information 701 is received from a user as a response to providing of the emotion information, an updater 710 of the electronic device 1 may obtain feedback information 702 corresponding to the user's feedback. The updater 710 may update a weight model needed for generation of an emotion model. The weight model may update weighting factors for expert emotion models (EEMs).

The updater 710 may identify a neutral network model for which a weight value is to be reduced and an emotion to be updated.

The updater 710 may select a neutral network model having the smallest confidence value among confidence values corresponding to feedback information from among neutral network models. For example, in (a) of FIG. 7, in a case where emotion information provided through recognition of multimedia data is 'Happy', user feedback information may be 'Neutral'. In this case, the updater 710 may identify the emotion to be updated as 'Neutral', and identify as a neutral network model for which a weight value is to be reduced among neutral network models 720 of (b) of FIG. 7, an audio model 721 having the smallest confidence value 721-1 among confidence values corresponding to 'Neutral'.

Once the updater 710 identifies the neutral network model for which the weight value is to be reduced and the emotion to be updated, the updater 710 may adjust weight values of the emotion to be updated in the weight model. For example, the updater 710 may reduce in the weight model, a weight value of an emotion corresponding to the feedback information for the identified neutral network model. The updater 710 may increase in the weight model, a weight value of an emotion corresponding to the feedback information for each of the other neutral network models except for the identified neutral network model. For example, as illustrated in (c) of FIG. 7, the updater 710 may identify an emotion to be updated as 'Neutral' for a pre-update weight model 730 and generate a post-update weight model 740 by updating weight values 741 of 'Neutral'. A weight value may be also referred to as a weighting factor. More specifically, the updater 710 may reduce weight values of 'Neutral' in an audio model 731 by a constant value Δ (e.g., 0.05) and increase weight values of 'Neutral' in the other neutral network models, i.e., a video model 732 and a language model 733, by a constant value $\Delta/(N_x-1)$ (e.g., 0.025).

FIG. 7 thus illustrates a learning process by which weight factors are adjusted (item 710 "EEM WEIGHTING FACTOR UPDATER"). In FIG. 7, the table on the lower left is described as "PRE-UPDATE," while the table on the lower right is described as "POST-UPDATE." As mentioned above, for this example, a weight value for neutral for the audio model has decreased from 0.1 to 0.05 based on the feedback information 702.

Figure 8:
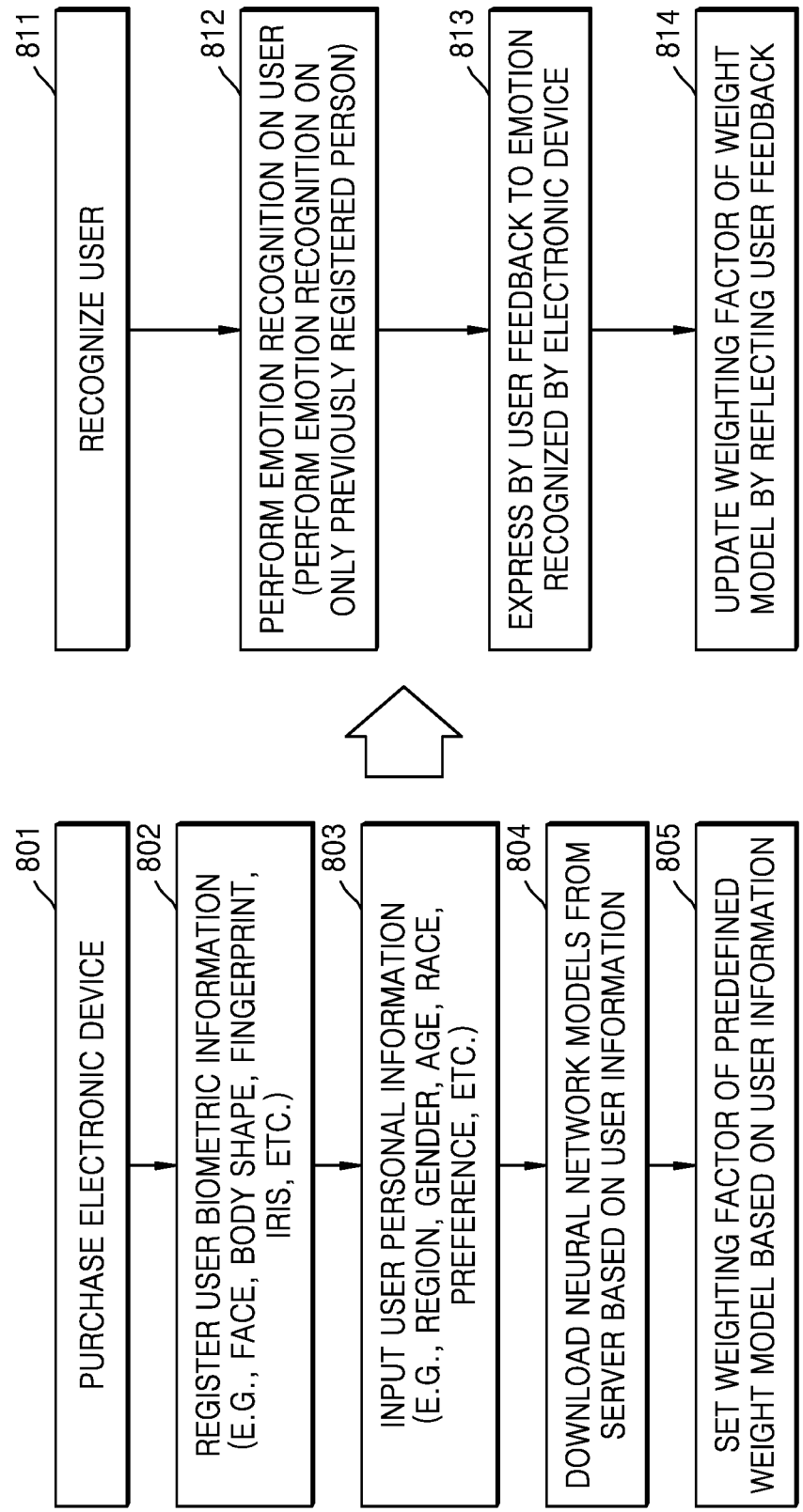
FIG. 8 illustrates a process of purchasing and using an electronic device, according to an embodiment of the disclosure.

FIG. 8 illustrates a process of purchasing and using an electronic device according to an embodiment of the disclosure.

In FIG. 8, the user may purchase the electronic device 1 in operation 801. The user may register user's biometric information in the electronic device 1 in operation 802. For example, the user may register the biometric information such as user's face, body shape, fingerprint, iris, etc. The user may also input user's characteristics (e.g., personal information) in the electronic device 1 in operation 803. For example, the user may directly input user's residential district, gender, age, race, preference, etc., or select them from a candidate list.

Once the electronic device 1 obtains the user's biometric information and personal information, the electronic device 1 may download neutral network models from an external device (e.g., a server) based on user characteristic information about the user's characteristics in operation 804.

The neutral network models may include at least one of a voice mode, a facial expression model (or an image recognition model), a language model, a gesture model, a body temperature model, or a brainwave model, and according to various embodiments of the disclosure, a plurality of neural network models may be downloaded for each neural network model of the above-described type. For example, as a facial expression model, a female facial expression model and a male facial expression model, and a children facial expression model and an adult facial expression model may be downloaded.

The electronic device 1 may set a weighting factor of a weight model based on user characteristic information in operation 805. The electronic device 1 may set the weighting factor of the weight model based on the user characteristic information and types or characteristics of the downloaded neural network models.

Thereafter, as illustrated in FIG. 8, in a case where a user's request is generated or in a preset situation, the electronic device 1 may recognize the user in operation 811.

Once the electronic device 1 recognizes the user, the electronic device 1 may perform emotion recognition on the recognized user in operation 812. For example, the electronic device 1 may recognize multimedia data regarding the user and provide emotion information regarding the user as a recognition result. In this case, the electronic device 1 may perform emotion recognition with respect to a previously registered person. For example, the electronic device 1 may perform emotion recognition with respect to only a person (e.g., a user, a family member, etc.) for which personal information is input.

Once emotion information is provided as an emotion recognized by the electronic device 1, the user may express a feedback to an emotion recognized by the electronic device 1 in operation 813. For example, in a case where an emotion recognized by the electronic device 1 is 'Surprise', the feedback expressed by the user may be 'Disgust'.

In this case, the electronic device 1 may update a weighting factor of a weight model by reflecting a user's feedback. For example, as described in FIG. 7, the electronic device 1 may identify at least one emotion to be updated in a weight model and adjust weight values for at least one emotion to be updated.

FIG. 8 includes initialization (801-805) and personalization (811-814).

During initialization, in some embodiments, user information is obtained (802-803). At the conclusion of initialization, in some embodiments, weighting factors have been set based on user information (805).

During personalization, in some embodiments, a user is recognized (811); an emotion is recognized (812, also see FIG. 1 multimedia data 101 and emotion information 103), and the emotion information may be provided to the user (see, for example, FIG. 1, "You were surprised."). The user expresses feedback about the emotion information provided. For example, in an instance of the information "You were surprised" the person may provide feedback "I just felt down." The feedback is accepted as an input and weighting factors are updated based on the feedback (814).

FIGS. 9A through 9C illustrate scenarios using an electronic device according to an embodiment of the disclosure.

In an embodiment of the disclosure, in (a) of FIG. 9A, once the electronic device 1 obtains multimedia data regarding user's face/voice/conversation in operation 901, the electronic device 1 may perform multimodal-based emotion recognition in operation 902. The multimodal-based emotion recognition may be emotion recognition using a plurality of neural network models, a weight model, and emotion models according to an embodiment of the disclosure.

In a case where the electronic device 1 recognizes a user's emotion, the electronic device 1 may provide emotion information that is a result of emotion recognition to the user. For example, the electronic device 1 may output a sound 'you were surprised!' 903 as a natural language corresponding to the emotion information.

Once the emotion information is provided, the user may provide a feedback to the emotion information. For example, the user may provide a feedback using a language, 'I just felt down.' 904.

The electronic device 1 may update an emotion recognition module by recognizing a user's feedback in operation 905. The electronic device 1 may recognize from the user's feedback that a user's real emotion is 'Disgust'. The electronic device 1 may update a weight module included in an emotion recognition module by using a result of the recognition.

In another embodiment of the disclosure, in (b) of FIG. 9A, once the electronic device 1 obtains multimedia data regarding user's face/voice/conversation in operation 911, the electronic device 1 may perform multimodal-based emotion recognition in operation 912.

In a case where the electronic device 1 recognizes a user's emotion, the electronic device 1 may provide emotion information that is a result of emotion recognition to the user. For example, the electronic device 1 may output a sound 'you were surprised!' 913 as a natural language corresponding to the emotion information.

Once the emotion information is provided, the user may provide a feedback with respect to the emotion information by using a language and an existing photo. For example, the user may select a photo having a facial expression 'Surprise' from among photos included in an album while providing a feedback in a language, 'My facial expression is like this when I'm surprised.' 914.

The electronic device 1 may update an emotion recognition module by recognizing a user's feedback in operation 915. For example, the electronic device 1 may recognize a user's face corresponding to a user's emotion 'Surprise' from the selected photo. The electronic device 1 may update a weight module included in an emotion recognition module by using a result of the recognition.

In another embodiment of the disclosure, in (c) of FIG. 9B, once the electronic device 1 obtains multimedia data regarding user's face/voice/conversation in operation 921, the electronic device 1 may perform multimodal-based emotion recognition in operation 922.

The electronic device 1 may recommend content (e.g., audio content, video content, image content, etc.) based on a result of emotion recognition in operation 923.

Once the recommended content is provided, the user may provide a feedback with respect to the content. For example, the user may express a negative or positive emotion after identifying the content in operation 924.

The electronic device 1 may update an emotion recognition module by recognizing a user's feedback in operation 925. For example, in a case where the user shows an unsatisfactory facial expression or action, the electronic device 1 may recognize a user's face or action as a negative emotion. Thus, the electronic device 1 may update a weight module included in an emotion recognition module by using a result of the recognition.

In another embodiment of the disclosure, in (d) of FIG. 9B, once the electronic device 1 obtains multimedia data regarding user's face/voice/conversation in operation 931, the electronic device 1 may perform multimodal-based emotion recognition in operation 932.

The electronic device 1 may recommend content (e.g., audio content, video content, image content, etc.) based on a result of emotion recognition in operation 933.

Once the recommended content is provided, the user may provide a feedback with respect to the content. For example, after identifying content, the user may terminate the recommended content or select another content, within a specific time (e.g., 5 seconds) in operation 934.

The electronic device 1 may update an emotion recognition module by recognizing a user's feedback in operation 935. For example, the electronic device 1 may recognize from the user's action that the user does not desire the content, and update a weight model included in the emotion recognition module by using a result of the recognition.

In another embodiment of the disclosure, in (e) of FIG. 9C, once the electronic device 1 obtains multimedia data regarding user's face/voice/conversation in operation 941, the electronic device 1 may perform multimodal-based emotion recognition in operation 942.

The electronic device 1 may recommend content (e.g., audio content, video content, image content, etc.) based on a result of emotion recognition in operation 943.

Once the recommended content is provided, the user may provide a feedback with respect to the content. For example, after the recommended content is reproduced, the user may be moved away from the electronic device 1 by a specific distance (e.g., 3 meters or more) in operation 944.

The electronic device 1 may update the emotion recognition module by recognizing a user's feedback in operation 945. For example, the electronic device 1 may recognize from the user's action that the user is not interested in the content or that the user desires to stop using the electronic device 1. Thus, the electronic device 1 may update a weight module included in an emotion recognition module by using a result of the recognition in operation 945.

In another embodiment of the disclosure, in (f) of FIG. 9C, once the electronic device 1 obtains multimedia data regarding user's face/voice/conversation in operation 951, the electronic device 1 may perform multimodal-based emotion recognition in operation 952.

The electronic device 1 may recommend content (e.g., audio content, video content, image content, etc.) based on a result of emotion recognition in operation 953.

Once the recommended content is provided, the user may provide a feedback with respect to the content. For example, after the recommended content is reproduced, the user may make a conversation, which is not related to the currently reproduced content, with acquaintances for a long time (e.g., 10 minutes or longer) in operation 954.

The electronic device 1 may update the emotion recognition module by recognizing a user's feedback in operation 955. For example, the electronic device 1 may recognize from the user's feedback that the user is not interested in the content. Thus, the electronic device 1 may update a weight module included in an emotion recognition module by using a result of the recognition.

Figure 10:
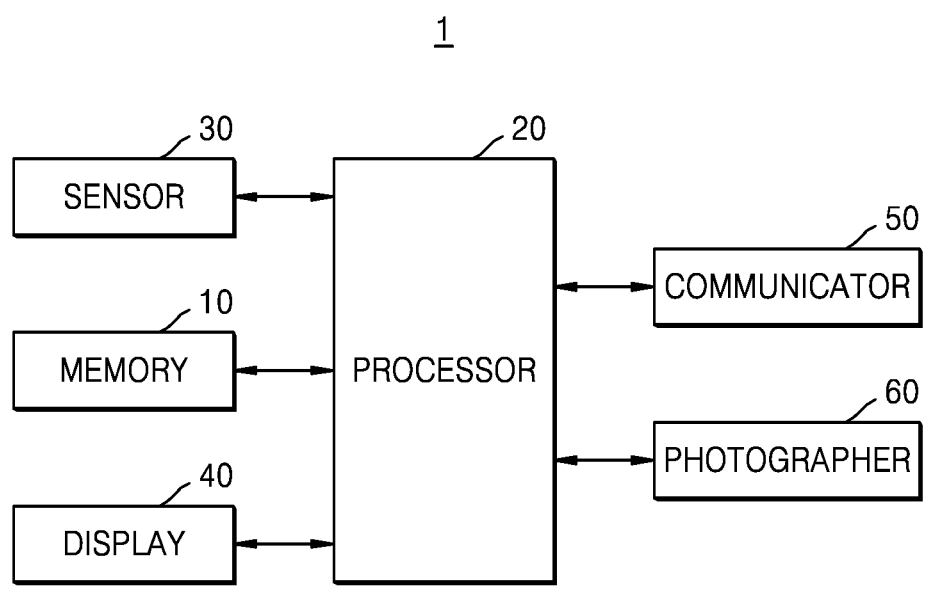
FIG. 10 is a block diagram of an electronic device according to another embodiment of the disclosure.

FIG. 10 is a block diagram of an electronic device according to another embodiment of the disclosure.

Referring to FIG. 10, the electronic device 1 may include a memory 10, a processor 20, a sensor 30, a display 40, a communicator 50, and a photographer 60. The memory 10 and the processor 20 have been described in detail above with reference to FIG. 2, and thus will not be described again.

The sensor 30 may include at least one of a gyro sensor, a GPS sensor, an acceleration sensor, an illumination sensor, a humidity sensor, or a biometric sensor (e.g., an iris recognition sensor, a fingerprint recognition sensor, a blood sugar sensor, etc.). The electronic device 1 may detect at least one of a person's voice, a user's facial expression, a user's action, or a user's biometric change (e.g., a change in the size of a pupil of the user, a change in the number of pulses of the user, a change in the speed of a blood flow of the user, a change in the body temperature of the user, a change in secretions of the user, etc.) by using at least one of the foregoing various sensors.

The display 40 may display various contents or emotion information that is a result of recognition of an emotion of the user. The display 40 may be implemented with a liquid crystal display (LCD), an organic light emitting display (OLED), a plasma display panel (PDP), etc., and display various screens that may be provided through the electronic device 1.

The communicator 50 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via a first network (e.g., a short-range communication network, such as Bluetooth™ wireless-fidelity (Wi-Fi) direct, or infrared data association (IrDA)) or a second network (e.g., a long-range communication network, such as a cellular network, the Internet, or a computer network (e.g., LAN or wide area network (WAN)). These various types of communication modules may be implemented as software, a single component (e.g., a single chip), or multi components (e.g., multi chips) that are separate from each other.

The communicator 50 may perform communication with an external server as described above. For example, the communicator 50 may transmit multimedia data regarding a person to a server and receive various results (e.g., predicted values for an emotion of the user) from the server. In another example, the communicator 50 may transmit user characteristic information to the server and receive at least one neural network model based on the user characteristic information from the server.

The photographer 60 may photograph a person, an environment around the person, etc. A captured image, together with various data obtained by the sensor 30, may be transmitted to an external server capable of predicting a user's emotion.

Figure 11:
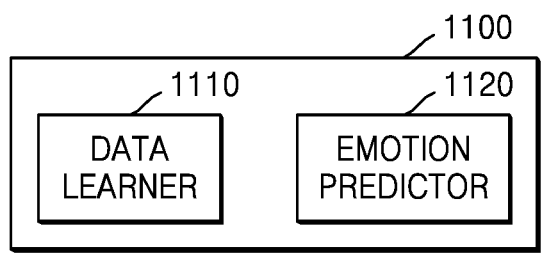
FIG. 11 is a block diagram of an emotion prediction apparatus according to an embodiment of the disclosure.

FIG. 11 is a block diagram of an emotion prediction apparatus according to an embodiment of the disclosure.

Referring to FIG. 11, an emotion prediction apparatus 1100 may include a data learner 1110 and an emotion predictor 1120. The emotion prediction apparatus 1100 may correspond to the processor 20 of the electronic device 1 or may correspond to a processor of an AI server capable of communicating with the electronic device 1.

The data learner 1110 may train a neural network model to have a criterion for prediction of an emotion of the user. The emotion prediction apparatus 1100 may predict the user's emotion by analyzing input data according to the trained criterion. The data learner 1110 may identify data to be used for training of the neural network model. The data learner 1110 may train a neural network model to predict a person's emotion by applying the obtained data to the neural network model, in a case where data (e.g., feedback information, etc.) to be used for training is determined.

The emotion predictor 1120 may predict a user's emotion from data (e.g., at least a part of multimedia data) by using a previously trained neural network model configured to predict an emotion of an user. The emotion predictor 1120 may obtain data (e.g., at least a part of multimedia data) and predict a person's emotion by applying the obtained data to the neural network model configured to predict the user's emotion.

At least a part of the data learner 1110 and at least a part of the emotion predictor 1120 may be manufactured in the form of at least one hardware chip and mounted on an electronic device. For example, at least one of the data learner 1110 or the emotion predictor 1120 may be manufactured in the form of a dedicated hardware chip for artificial intelligence (AI), or may be manufactured as a part of an existing general-purpose processor (e.g., a central processing unit (CPU), or an application processor) or a dedicated graphic processor (e.g., a graphic processing unit (GPU)) and mounted on various electronic devices. In this case, a dedicated hardware chip for AI may be a dedicated processor specialized for probability calculation, and may be a chip that processes fast an arithmetic operation in the field of AI such as mechanical learning owing to higher parallel processing performance than that of an existing general-purpose processor.

The data learner 1110 and the emotion predictor 1120 may be implemented with a software module (or a programming module including instructions). The software module may be stored in a non-transitory computer-readable medium. In this case, at least a part of the software module may be provided by an OS, and another part of the software module may be provided by an application.

The neural network model may be established based on an application field of the neural network model, a purpose of learning, computer performance of a device, etc. The neural network model may include, for example, a plurality of network nodes having weight values. A plurality of network nodes may be located at different depths (or layers) and may transmit and receive data according to a convolution connection relationship. A model such as, but not limited to, a deep neural network (DNN), a recurrent neural network (RNN), a bidirectional recurrent deep neural network (BRDNN), or the like may be used as the neutral network model.

Although it is illustrated in the embodiment of FIG. 11 that the data learner 1110 and the emotion predictor 1120 are mounted on one device, they may also be mounted on separate devices. For example, one of the data learner 1110 and the emotion predictor 1120 may be included in the electronic device 1, and the other may be included in a server. The data learner 1110 and the emotion predictor 1120 may be connected in a wired or wireless manner, such that information about a neural network model configured to predict a user's emotion, which has been established by the data learner 1110, may be provided to the emotion predictor 1120 or data input to the emotion predictor 1120 may be provided to the data learner 1110 as additional learning data.

Meanwhile, at least one of the data learner 1110 or the emotion predictor 1120 may be implemented with a software module. In a case where at least one of the data learner 1110 or the emotion predictor 1120 is implemented with a software module (or a programming module including instructions), the software module may be stored in a non-transitory computer-readable recording medium. At least one software module may be provided by an OS or by an application. A part of the at least one software module may be provided by the OS and another part thereof may be provided by an application.

Figure 12A:
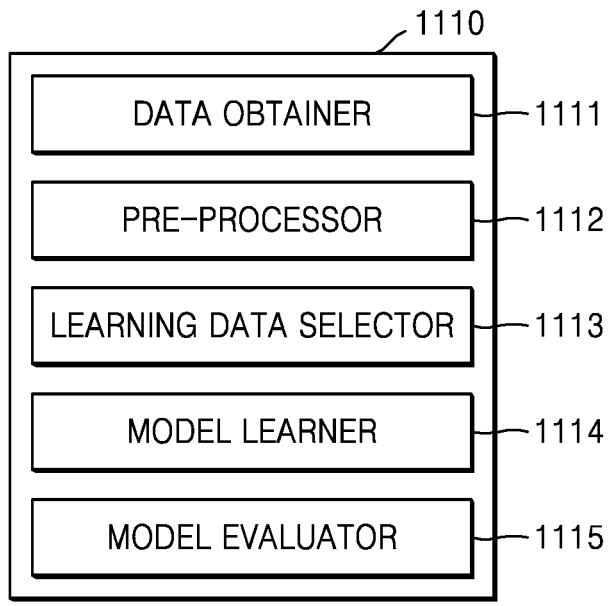
FIG. 12A is a block diagram of a data learner according to an embodiment of the disclosure.

FIG. 12A is a block diagram of a data learner according to an embodiment of the disclosure. Referring to FIG. 12A, the data learner 1110 according to some embodiments of the disclosure may include a data obtainer 1111, a pre-processor 1112, a learning data selector 1113, a model learner 1114, and a model evaluator 1115.

The data obtainer 1111 may obtain data needed to predict a person's emotion. In particular, the data obtainer 1111 may obtain multimedia data or additional data as learning data.

The pre-processor 1112 may pre-process the obtained data, such that the obtained data may be used in learning for predicting the person's emotion. The pre-processor 1112 may process the obtained data into a preset format, such that the model learner 1114 may use the obtained data in learning for predicting the person's emotion.

The learning data selector 1113 may select data needed for learning from pre-processed data. The selected data may be provided to the model learner 1114. The learning data selector 1113 may select data needed for learning from pre-processed data, according to a preset criterion for predicting the person's emotion. The learning data selector 1113 may also select data according to a criterion that is preset by learning of the model learner 1114. The model learner 1114 may learn a criterion regarding how to predict the person's emotion based on learning data. The model learner 1114 may also learn a criterion regarding which learning data is to be used to predict the person's emotion.

The model learner 1114 may train a data recognition model used to predict the person's emotion using learning data. In this case, the neural network model may be previously established. For example, the neural network model may be previously established using input basic learning data. In another example, the neural network model may be previously established using big data.

The neural network model may be established based on an application field of a recognition model, a purpose of learning, computer performance of a device, etc. The neural network model may be based on, for example, a neural network.

Various embodiments of the disclosure, in a case where there are a plurality of neural network models established in advance, the model learner 1114 may determine a neural network model having a high correlation between input learning data and basic learning data as a neural network model to be learned. In this case, the basic learning data may be classified in advance according to a data type, and the neural network model may be established in advance for each data type. For example, the basic learning data may be classified depending on various criteria such as a region where learning data is generated, a time in which learning data is generated, a size of learning data, a genre of learning data, a generator of learning data, a type of an object in learning data, and so forth.

The model learner 1114 may learn an emotion prediction model using a learning algorithm such as error back-propagation or gradient descent.

The model learner 1114 causes the neural network model to learn using supervised learning having learning data as an input value. The model learner 1114 may cause the neural network model to learn using unsupervised learning in which the neural network model discovers a criterion for predicting the person's emotion by learning a type of data needed for predicting the person's emotion without separate supervision. The model learner 1114 learns the neural network model using reinforcement learning based on a feedback regarding whether a prediction result of the person's emotion based on learning is correct or not.

Once the model learner 1114 learns the neural network model, the model learner 1114 may store the learned neural network model configured to predict the person's network. In this case, the model learner 1114 may store the learned neural network model in the memory 10 of the electronic device 1 or a memory of a server.

In a case where a recognition result output after input of evaluation data to the neural network model configured to predict the person's emotion fails to satisfy a criterion, the model evaluator 1115 may cause the model learner 1114 to learn again. In this case, the evaluation data may be preset data for evaluating the neural network model.

For example, the model evaluator 1115 may evaluate that the criterion is not satisfied in a case where among prediction results of the learned neural network model regarding evaluation data, the number or rate of evaluation data having inaccurate prediction results exceeds a preset threshold value.

In a case where there are a plurality of learned neural network models, the model evaluator 1115 may evaluate whether each learned neural network model satisfies the criterion, and determine a learned neural network model satisfying the criterion as a final neural network model. In this case, in a case where a plurality of learned neural network models satisfy the criterion, the model evaluator 1115 may determine preset any one model or a number of models as a final neural network model for predicting the person's emotion in a higher evaluation grade order.

At least one of the data obtainer 1111, the pre-processor 1112, the learning data selector 1113, the model learner 1114, or the model evaluator 1115 may be manufactured in the form of at least one hardware chip and mounted on the electronic device. For example, at least one of the data obtainer 1111, the pre-processor 1112, the learning data selector 1113, the model learner 1114, or the model evaluator 1115 may be manufactured in the form of a dedicated hardware chip for AI, or may be manufactured as a part of an existing general-purpose processor (e.g., a CPU or an application processor) and mounted on the electronic device 1 or a server.

The data obtainer 1111, the pre-processor 1112, the learning data selector 1113, the model learner 1114, and the model evaluator 1115 may be mounted on one electronic device or on separate electronic devices, respectively. For example, some of the data obtainer 1111, the pre-processor 1112, the learning data selector 1113, the model learner 1114, and the model evaluator 1115 may be included in the electronic device, and some others thereof may be included in a server.

At least one of the data obtainer 1111, the pre-processor 1112, the learning data selector 1113, the model learner 1114, or the model evaluator 1115 may be implemented with a software module. When at least one of the data obtainer 1111, the pre-processor 1112, the learning data selector 1113, the model learner 1114, or the model evaluator 1115 is implemented with a software module (or a program module including an instruction), the software module may be stored in a non-transitory computer-readable medium. At least one software module may be provided by an OS or by an application. A part of the at least one software module may be provided by the OS and another part thereof may be provided by an application.

Figure 12B:
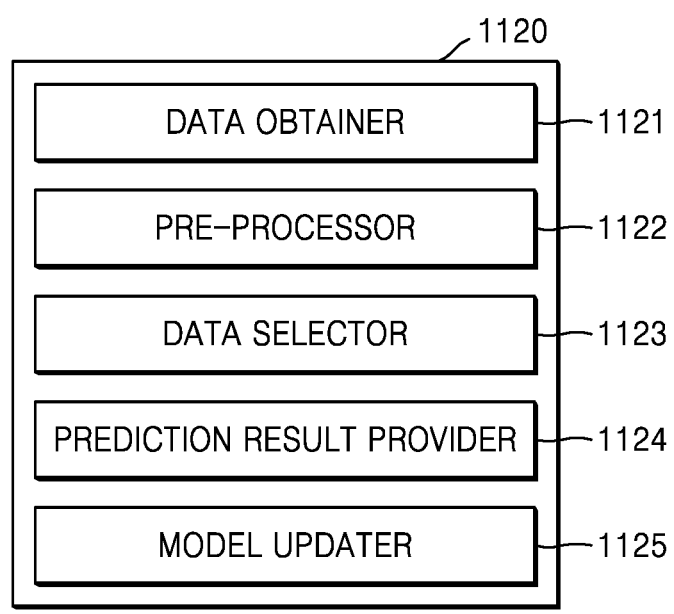
FIG. 12B is a block diagram of an emotion predictor according to an embodiment of the disclosure.

FIG. 12B is a block diagram of an emotion predictor 1120 according to an embodiment of the disclosure. Referring to FIG. 12B, the emotion predictor 1120 according to an embodiment of the disclosure may include a data obtainer 1121, a pre-processor 1122, a data selector 1123, a prediction result provider 1124, and a model updater 1125.

The data obtainer 1121 may obtain data needed for predicting the person's emotion, and the pre-processor 1122 may pre-process the obtained data such that the data obtained for predicting the person's emotion may be used. The pre-processor 1122 may process the obtained data into a preset format, such that the prediction result provider 1124 may use the data obtained for predicting the person's emotion.

The data selector 1123 may select the data needed for predicting the person's emotion from the pre-processed data. The selected data may be provided to the prediction result provider 1124. The data selector 1123 may select the entire pre-processed data or a part thereof, according to a preset criterion for predicting the person's emotion. The data selector 1123 may also select data according to a criterion that is preset by learning of the model learner 1114.

The prediction result provider 1124 may predict the user's emotion by applying the selected data to the neural network model configured to predict the person's emotion. The prediction result provider 1124 may apply the selected data to the neural network model by using data selected by the data selector 1123 as an input value. The prediction result may be determined by the neural network model. For example, the prediction result provider 1124 may input data for identifying the user's real emotion to the emotion prediction model to identify the user's real emotion.

The model updater 1125 may control the neural network model to be updated based on evaluation with respect to the prediction result provided by the prediction result provider 1124. The model updater 1125 may include, for example, the updater 140 of FIG. 1. For example, the model updater 1125 may provide the prediction result provided by the prediction result provider 1124 to the model learner 1114, allowing the model learner 1114 to update the neural network model.

At least one of the data obtainer 1121, the pre-processor 1122, the data selector 1123, the prediction result provider 1124, or the model updater 1125 may be manufactured in the form of at least one hardware chip and mounted on the electronic device. For example, at least one of the data obtainer 1121, the pre-processor 1122, the data selector 1123, the prediction result provider 1124, or the model updater 1125 may be manufactured in the form of a dedicated hardware chip for AI, or may be manufactured as a part of an existing general-purpose processor (e.g., a CPU or an application processor) and mounted on the electronic device 1 or a server.

The data obtainer 1121, the pre-processor 1122, the data selector 1123, the prediction result provider 1124, and the model updater 1125 may be mounted on one electronic device or on separate electronic devices, respectively. For example, some of the data obtainer 1121, the pre-processor 1122, the data selector 1123, the prediction result provider 1124, and the model updater 1125 may be included in the electronic device 1, and some others thereof may be included in a server operating with the electronic device 1.

At least one of the data obtainer 1121, the pre-processor 1122, the data selector 1123, the prediction result provider 1124, or the model updater 1125 may be implemented with a software module. When at least one of the data obtainer 1121, the pre-processor 1122, the data selector 1123, the prediction result provider 1124, or the model updater 1125 is implemented with a software module (or a program module including an instruction), the software module may be stored in a non-transitory computer-readable medium. At least one software module may be provided by an OS or by an application. A part of the at least one software module may be provided by the OS and another part thereof may be provided by an application.

According to various embodiments of the disclosure, the electronic device 1 may use an AI agent to perform the above-described operation. In this case, the AI agent is a dedicated program for providing an AI-based service (e.g., a voice recognition service, an assistant service, a translation service, a search service, etc.) and may be executed by an existing general-purpose processor (e.g., a CPU) or a separate AI dedicated processor (e.g., a GPU, etc.).

Figure 13:
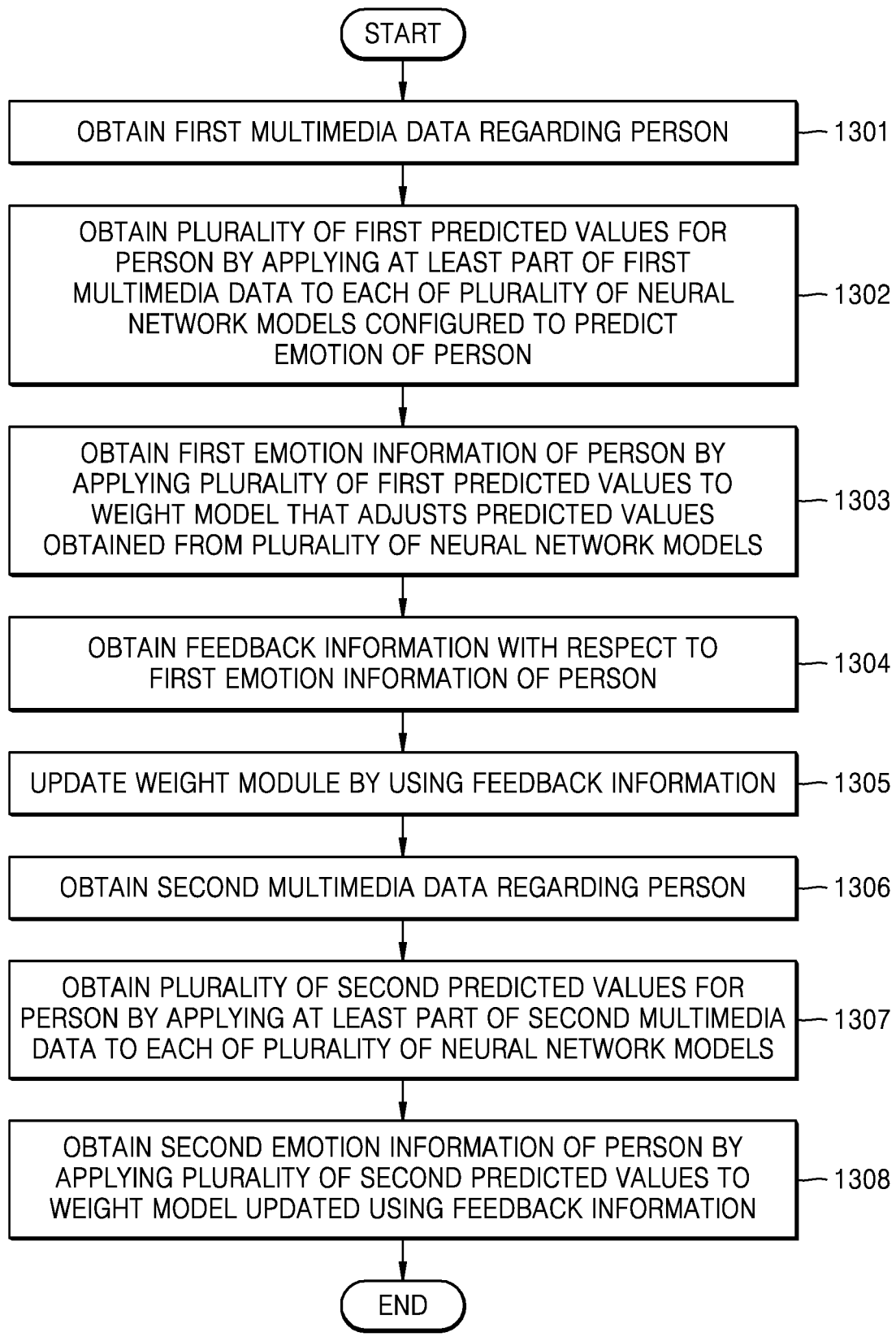
FIG. 13 is a flowchart of a process by which an electronic device obtains emotion information, according to an embodiment of the disclosure.

FIG. 13 is a flowchart of a process by which an electronic device obtains emotion information, according to an embodiment of the disclosure.

Referring to FIG. 13, the electronic device 1 may obtain first multimedia data regarding a person in operation 1301.

The electronic device 1 may obtain a plurality of first predicted values for the person by applying at least a part of the first multimedia data to each of a plurality of neural network models configured to predict an emotion of the person, in operation 1302.

The electronic device 1 may obtain first emotion information of the person by applying the plurality of first predicted values to a weight model that adjusts predicted values obtained from the plurality of neural network models, in operation 1303. In this case, the weight model may include a weight value to be applied to predicted values obtained from a plurality of neural network models classified by emotion.

According to various embodiments of the disclosure, the electronic device 1 may generate a plurality of emotion models, each of which includes confidence values for a plurality of emotions, by applying the plurality of first predicted values to the weight model. The electronic device 1 may obtain first emotion information of the person based on confidence values for the plurality of emotions included in each of a plurality of emotion models. In particular, the electronic device 1 may obtain the first emotion information of the person based on at least one emotion candidate having a maximum value among the confidence values for the plurality of emotions included in each of the plurality of emotion models. The electronic device 1 may obtain as the first emotion information of the person, a main emotion candidate having most votes among the at least one emotion candidate having the maximum value.

The electronic device 1 may obtain feedback information with respect to the first emotion information of the person in operation 1304. For example, the electronic device 1 may obtain the feedback information by applying a user's feedback to at least one of the plurality of neural network models.

The electronic device 1 may update a weight model by using the feedback information in operation 1305. For example, the electronic device 1 may update a weight value of an emotion corresponding to feedback information in the weight model.

After the updating of the weight model, the electronic device 1 may obtain second multimedia data regarding a person in operation 1306.

The electronic device 1 may obtain a plurality of second predicted values for the person by applying at least a part of the second multimedia data to each of the plurality of neural network models, in operation 1307.

The electronic device 1 may obtain second emotion information of the person by applying the plurality of second predicted values to the weight model updated using the feedback information, in operation 1308.

As is apparent from the foregoing description, according to an embodiment of the disclosure, by applying feedback information to a weight model, personalized or customized emotion information for a person may be provided.

Thus, consumption of a resource of an electronic device or a network resource used by the electronic device may be minimized, and accurate emotion information may be continuously provided fast.

Moreover, various effects recognized directly or indirectly from the disclosure may be provided through a detailed description.

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software including one or more instructions that are stored in a machine-readable storage medium that is readable by a machine (e.g., a computer). The machine may invoke stored instructions from the storage medium and operate according to the invoked instructions, and may include an electronic device (e.g., the electronic device 1) according to the disclosed embodiments. When the instructions are executed by a processor, the processor may perform functions corresponding to the instructions. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments of the disclosure may be carried out sequentially, in parallel, repeatedly, or heuristically, or one or more of the operations may be executed in a different order or omitted, or one or more other operations may be added.

While the disclosure has been described with reference to limited embodiments and drawings as described above, the disclosure is not limited to the foregoing embodiments and it would be obvious to those of ordinary skill in the art that various modifications and changes may be possible from the disclosure. Therefore, the scope of the disclosure should be defined by the appended claims and equivalents thereof, rather than by the described embodiments.

What is claimed is:

1. An electronic device comprising:
   a memory storing a weight model that adjusts a plurality of predicted values obtained from a plurality of neural network models configured to predict an emotion of a person; and
   at least one processor configured to:
      obtain first multimedia data regarding the person,
      obtain a plurality of first predicted values for the person by applying at least a part of the first multimedia data to each of the plurality of neural network models,
      obtain first emotion information of the person by applying the plurality of first predicted values to the weight model,
      obtain feedback information with respect to the first emotion information of the person,
      update the weight model by using the feedback information,
      obtain second multimedia data regarding the person,
      obtain a plurality of second predicted values for the person by applying at least a part of the second multimedia data to each of the plurality of neural network models, and
      obtain second emotion information of the person by applying the plurality of second predicted values to the weight model updated using the feedback information,
   wherein the at least one processor is further configured to, when obtaining the first emotion information of the person:
      generate a plurality of emotion models, each of which includes confidence values for a plurality of emotions, by applying the plurality of first predicted values to the weight model; and
      obtain the first emotion information of the person based on the confidence values for the plurality of emotions included in each of the plurality of emotion models.

2. The electronic device of claim 1, wherein the at least one processor is further configured to, when updating the weight model, update a weight value for an emotion corresponding to the feedback information.

3. The electronic device of claim 1, wherein the weight model comprises a weight value to be applied to predicted values obtained from the plurality of neural network models classified by emotion.

4. The electronic device of claim 1, wherein the at least one processor is further configured to, when obtaining the first emotion information of the person, obtain the first emotion information of the person based on at least one emotion candidate having a maximum value among the confidence values for the plurality of emotions included in each of the plurality of emotion models.

5. The electronic device of claim 4, wherein the at least one processor is further configured to, when obtaining the first emotion information of the person, obtain as the first emotion information of the person, a main emotion candidate having most votes among the at least one emotion candidate having the maximum value, wherein each emotion candidate having the maximum value in an emotion model of the plurality of emotion models is accorded one vote.

6. The electronic device of claim 1, wherein the at least one processor is further configured to, when obtaining the feedback information, obtain the feedback information by applying feedback of the person to at least one of the plurality of neural network models.

7. The electronic device of claim 1, wherein the multimedia data comprises two or more among image data, video data, audio data, text data, and graphic data regarding the person.

8. The electronic device of claim 1, wherein the plurality of neural network models are selectively downloaded from an external server based on characteristic information of the person.

9. The electronic device of claim 1, wherein the feedback information comprises at least one of a voice, a facial expression, an action, or a biometric change of the person.

10. A method, performed by an electronic device, of obtaining emotion information, the method comprising:
   obtaining first multimedia data regarding a person;
   obtaining a plurality of first predicted values for the person by applying at least a part of the first multimedia data to each of a plurality of neural network models configured to predict an emotion of the person;
   obtaining first emotion information of the person by applying the plurality of first predicted values to a weight model that adjusts predicted values obtained from the plurality of neural network models;
   obtaining feedback information with respect to the first emotion information of the person;
   updating the weight model by using the feedback information;
   obtaining second multimedia data regarding the person;
   obtaining a plurality of second predicted values for the person by applying at least a part of the second multimedia data to each of the plurality of neural network models; and
   obtaining second emotion information of the person by applying the plurality of second predicted values to the weight model updated using the feedback information,
   wherein the obtaining of the first emotion information of the person comprises:
      generating a plurality of emotion models, each of which includes confidence values for a plurality of emotions, by applying the plurality of first predicted values to the weight model; and
      obtaining the first emotion information of the person based on the confidence values for the plurality of emotions included in each of the plurality of emotion models.

11. The method of claim 10, wherein the updating of the weight model comprises updating a weight value for an emotion corresponding to the feedback information.

12. The method of claim 10, wherein the weight model comprises a weight value to be applied to predicted values obtained from the plurality of neural network models classified by emotion.

13. The method of claim 10, wherein the obtaining of the first emotion information of the person comprises obtaining the first emotion information of the person based on at least one emotion candidate having a maximum value among the confidence values for the plurality of emotions included in each of the plurality of emotion models.

14. The method of claim 13, wherein the obtaining of the first emotion information of the person comprises obtaining, as the first emotion information of the person, a main emotion candidate having most votes among the at least one emotion candidate having the maximum value, wherein each emotion candidate having the maximum value in an emotion model of the plurality of emotion models is accorded one vote.

15. The method of claim 10, wherein the obtaining of the feedback information comprises obtaining the feedback information by applying feedback of the person to at least one of the plurality of neural network models.

16. The method of claim 10, wherein the multimedia data comprises two or more among image data, video data, audio data, text data, and graphic data regarding the person.

17. The method of claim 10, wherein the plurality of neural network models are selectively downloaded from an external server based on characteristic information of the person.

18. The method of claim 10, wherein the feedback information of the person comprises at least one of a voice, a facial expression, an action, or a biometric change of the person.

* * * * *